United States Patent
Rico Alvarino et al.

(10) Patent No.: US 10,455,558 B2
(45) Date of Patent: Oct. 22, 2019

(54) HANDLING FOR INTERRUPTION DUE TO CARRIER SWITCHING AND CARRIER SWITCHING CAPABILITY INDICATION

(71) Applicant: QUALCOMM Incorporated, San Diego, CA (US)

(72) Inventors: Alberto Rico Alvarino, San Diego, CA (US); Peter Gaal, San Diego, CA (US); Hao Xu, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/498,246

(22) Filed: Apr. 26, 2017

(65) Prior Publication Data

US 2017/0332370 A1 Nov. 16, 2017

Related U.S. Application Data

(60) Provisional application No. 62/336,375, filed on May 13, 2016.

(51) Int. Cl.
*H04W 72/04* (2009.01)
*H04L 5/00* (2006.01)
(Continued)

(52) U.S. Cl.
CPC ......... *H04W 72/0413* (2013.01); *H04L 5/001* (2013.01); *H04L 5/0048* (2013.01);
(Continued)

(58) Field of Classification Search
CPC ........... H04W 72/0413; H04W 52/146; H04W 72/042; H04W 8/22; H04L 5/0048
See application file for complete search history.

(56) References Cited

U.S. PATENT DOCUMENTS 9,973,321 B2 * 5/2018 Henttonen ............ H04L 5/0091
2010/0197339 A1 * 8/2010 Pedersen ............... H04W 52/34
455/522

(Continued)

FOREIGN PATENT DOCUMENTS

EP 2996418 A1 3/2016
WO WO-2011160289 A1 12/2011
WO WO-2015142248 A1 9/2015

OTHER PUBLICATIONS

Huawei et al., "General Operation of SRS Carrier Based Switching", 3GPP TSG RAN WG1 Meeting #84bis, R1-162585, Apr. 2, 2016, XP051080273, Retrieved from the Internet: URL:http://www.3gpp.org/ftp/tsg_ran/WG1_RL1/TSGR1_84b/Docs/, 5 pages.

(Continued)

*Primary Examiner* — Jay P Patel
(74) *Attorney, Agent, or Firm* — Nerrie M. Zohn

(57) ABSTRACT

Aspects of the present disclosure provide procedures for handling interruption due to carrier switching for sounding reference signal transmission and for a carrier switching capability indication. A method by a user equipment (UE) is provided, generally including interrupting communication on a first component carrier (CC) to switch between the first CC and a second CC to transmit an uplink reference signal on the second CC and adjusting one or more parameters of an uplink transmission on the first component carrier to account for the interrupting communication on the second CC. In aspects, another method is provided in which, a UE receives a query from a base station for switching capability information of the UE for one or more carrier aggregation (CA) configurations and, in response to the query, provides an indication to the BS of the switching capability information of the UE for the one or more CA configurations.

96 Claims, 15 Drawing Sheets

(51) Int. Cl.
  *H04W 8/22* (2009.01)
  *H04W 52/14* (2009.01)
  *H04W 52/44* (2009.01)
  *H04W 52/48* (2009.01)
(52) U.S. Cl.
  CPC ............ *H04L 5/0098* (2013.01); *H04W 8/22* (2013.01); *H04W 52/146* (2013.01); *H04W 52/44* (2013.01); *H04W 52/48* (2013.01); *H04W 72/042* (2013.01)

(56) References Cited

U.S. PATENT DOCUMENTS

| | | | | |
|---|---|---|---|---|
| 2011/0243087 | A1* | 10/2011 | Ahn | H04W 52/146 370/329 |
| 2011/0275403 | A1* | 11/2011 | Chen | H04W 52/146 455/522 |
| 2012/0155272 | A1* | 6/2012 | Quan | H04L 5/003 370/235 |
| 2013/0090146 | A1* | 4/2013 | Kwon | H04W 52/365 455/509 |
| 2013/0100842 | A1* | 4/2013 | Nishikawa | H04W 52/146 370/252 |
| 2014/0092785 | A1* | 4/2014 | Song | H04L 1/00 370/280 |
| 2014/0161081 | A1* | 6/2014 | Han | H04W 52/146 370/329 |
| 2014/0194126 | A1* | 7/2014 | Tsuboi | H04W 36/0072 455/437 |
| 2014/0315593 | A1* | 10/2014 | Vrzic | H04W 52/38 455/522 |
| 2014/0369242 | A1 | 12/2014 | Ng et al. | |
| 2015/0334705 | A1* | 11/2015 | Zhao | H04W 36/22 370/329 |
| 2016/0198452 | A1* | 7/2016 | Takahashi | H04W 28/18 370/329 |
| 2017/0048839 | A1* | 2/2017 | Henttonen | H04L 5/0091 |
| 2017/0317775 | A1* | 11/2017 | Hwang | H04J 11/005 |
| 2017/0332370 | A1* | 11/2017 | Rico Alvarino | H04L 5/0048 |

OTHER PUBLICATIONS

Huawei et al., "Specification Impacts to Support SRS Carrier based Switching", 3GPP TSG RAN WG 1 Meeting #84bis, R1-162586, Apr. 2, 2016, XP051080274, Retrieved from the Internet: URL: http://www.3gpp.org/ftp/tsg_ran/WG1_RL1/TSGR1_84b/Docs/, 4 pages.

International Search Report and Written Opinion—PCT/US2017/029860—ISA/EPO—dated Jul. 24, 2017.

NTT Docomo et al., "Specification Impacts of 1CC Transmission in a TTI for UL CA", 3GPP TSG-RAN WG2 #79, R2-123998, Aug. 7, 2012, XP050665751, Retrieved from the Internet: URL:http://www.3gpp.org/ftp/tsg_ran/WG2_RL2/TSGR2_79/Docs/, 2 pages.

\* cited by examiner

HANDLING FOR INTERRUPTION DUE TO CARRIER SWITCHING AND CARRIER SWITCHING CAPABILITY INDICATION

CROSS-REFERENCE TO RELATED APPLICATION & PRIORITY CLAIM

This application claims benefit of and priority to U.S. Provisional Patent Application Ser. No. 62/336,375, filed May 13, 2016, which is herein incorporated by reference in its entirety for all applicable purposes.

BACKGROUND

Field of the Disclosure

Aspects of the present disclosure related generally to wireless communications systems, and more particularly, to methods and apparatus for handling uplink reference signal (e.g., sounding reference signal (SRS)) interruption due to carrier switching and for carrier switching capability indication.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include 3rd Generation Partnership Project (3GPP) Long Term Evolution (LTE) systems, LTE-Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of base stations (BSs) that can support communication for a number of wireless devices such as user equipments (UEs). A UE may communicate with a BS via the downlink and uplink. The downlink (or forward link) refers to the communication link from the BS to the UE, and the uplink (or reverse link) refers to the communication link from the UE to the BS. In an NR or 5G networks, the wireless multiple access communication system may include a number of distributed units (e.g., edge units (EUs), edge nodes (ENs), radio heads (RHs), smart radio heads (SRHs), transmission reception points (TRPs), etc.) in communication with a number of central units (e.g., CU, central nodes (CNs), access node controllers (ANCs), etc.), where a set of one or more distributed units (DUs), in communication with a CU, may define an access node (e.g., AN, NR BS, NR NB, 5G NB, network node, gNB, access point (AP), transmission reception point (TRP), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is Long Term Evolution (LTE). NR is a set of enhancements to the LTE mobile standard promulgated by 3GPP. NR is designed to better support mobile broadband Internet access by improving spectral efficiency, lower costs, improve services, make use of new spectrum, and better integrate with other open standards using OFDMA with a cyclic prefix on the downlink and on the uplink, as well as supporting beamforming, multiple-input multiple-output (MIMO) antenna technology, and carrier aggregation. However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques and apparatus for handling uplink reference signal (e.g., sounding reference signal (SRS)) interruption due to carrier switching and for a carrier switching capability indication are described herein.

In an aspect, a method for wireless communications is provided. The method may be performed, for example, by a user equipment (UE). The method generally includes interrupting communication on a first component carrier (CC) to switch between the first CC and a second CC to transmit an uplink reference signal on the second CC and adjusting one or more parameters (e.g., values thereof) of an uplink transmission on the first CC to account for the interrupting communication on the second CC.

In an aspect, a method for wireless communications is provided. The method may be performed, for example, by a UE. The method generally includes receiving a query from a BS for switching capability information of the UE for one or more carrier aggregation (CA) configurations; and in response to the query, providing an indication to the BS of the switching capability information of the UE for the one or more CA configurations.

In an aspect, a method for wireless communications is provided. The method may be performed, for example, by a BS. The method generally includes sending a query to a UE for switching capability information of the UE for one or more CA configurations; and in response to the query, receiving an indication of the switching capability information of the UE for the one or more CA configurations.

In an aspect, an apparatus for wireless communications is provided. The apparatus may be, for example, a UE. The apparatus generally includes means for interrupting communication on a first CC to switch between the first CC and a second CC to transmit an uplink reference signal on the second CC and means for adjusting one or more parameters (e.g., values thereof) of an uplink transmission on the first CC to account for the interrupting communication on the second CC.

In an aspect, an apparatus for wireless communications is provided. The apparatus may be, for example, a UE. The apparatus generally includes means for receiving a query from a BS for switching capability information of the UE for one or more CA configurations; and means for, in response to the query, providing an indication to the BS of the switching capability information of the UE for the one or more CA configurations.

In an aspect, an apparatus for wireless communications is provided. The apparatus may be, for example, by a BS. The apparatus generally includes means for sending a query to a UE for switching capability information of the UE for one or more CA configurations; and means for, in response to the query, receiving an indication of the switching capability information of the UE for the one or more CA configurations.

In an aspect, an apparatus for wireless communications is provided. The apparatus may be, for example, a UE. The apparatus generally includes at least one processor coupled with a memory and configured to interrupt communication on a first CC to switch between the first CC and a second CC to transmit an uplink reference signal on the second CC and adjust one or more parameters (e.g., values thereof) of an uplink transmission on the first CC to account for the interrupting communication on the second CC.

In an aspect, an apparatus for wireless communications is provided. The apparatus may be, for example, a UE. The apparatus generally includes at least one processor coupled with a memory and configured to receive a query from a BS for switching capability information of the UE for one or more CA configurations; and in response to the query, provide an indication to the BS of the switching capability information of the UE for the one or more CA configurations.

In an aspect, an apparatus for wireless communications is provided. The apparatus may be, for example, by a BS. The apparatus generally includes at least one processor coupled with a memory and configured to send a query to a UE for switching capability information of the UE for one or more CA configurations; and in response to the query, receive an indication of the switching capability information of the UE for the one or more CA configurations.

In an aspect, a computer readable medium having computer executable code stored thereon for wireless communications, for example by a UE, is provided. The computer executable code generally includes code for interrupting communication on a first CC to switch between the first CC and a second CC to transmit an uplink reference signal on the second CC and code for adjusting one or more parameters (e.g., values thereof) of an uplink transmission on the first CC to account for the interrupting communication on the second CC.

In an aspect, a computer readable medium having computer executable code stored thereon for wireless communications, for example by a UE, is provided. The computer executable code generally includes code for receiving a query from a BS for switching capability information of the UE for one or more CA configurations; and means for, in response to the query, providing an indication to the BS of the switching capability information of the UE for the one or more CA configurations.

In an aspect, a computer readable medium having computer executable code stored thereon for wireless communications, for example by a BS, is provided. The computer executable code generally includes code for sending a query to a UE for switching capability information of the UE for one or more CA configurations; and means for, in response to the query, receiving an indication of the switching capability information of the UE for the one or more CA configurations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
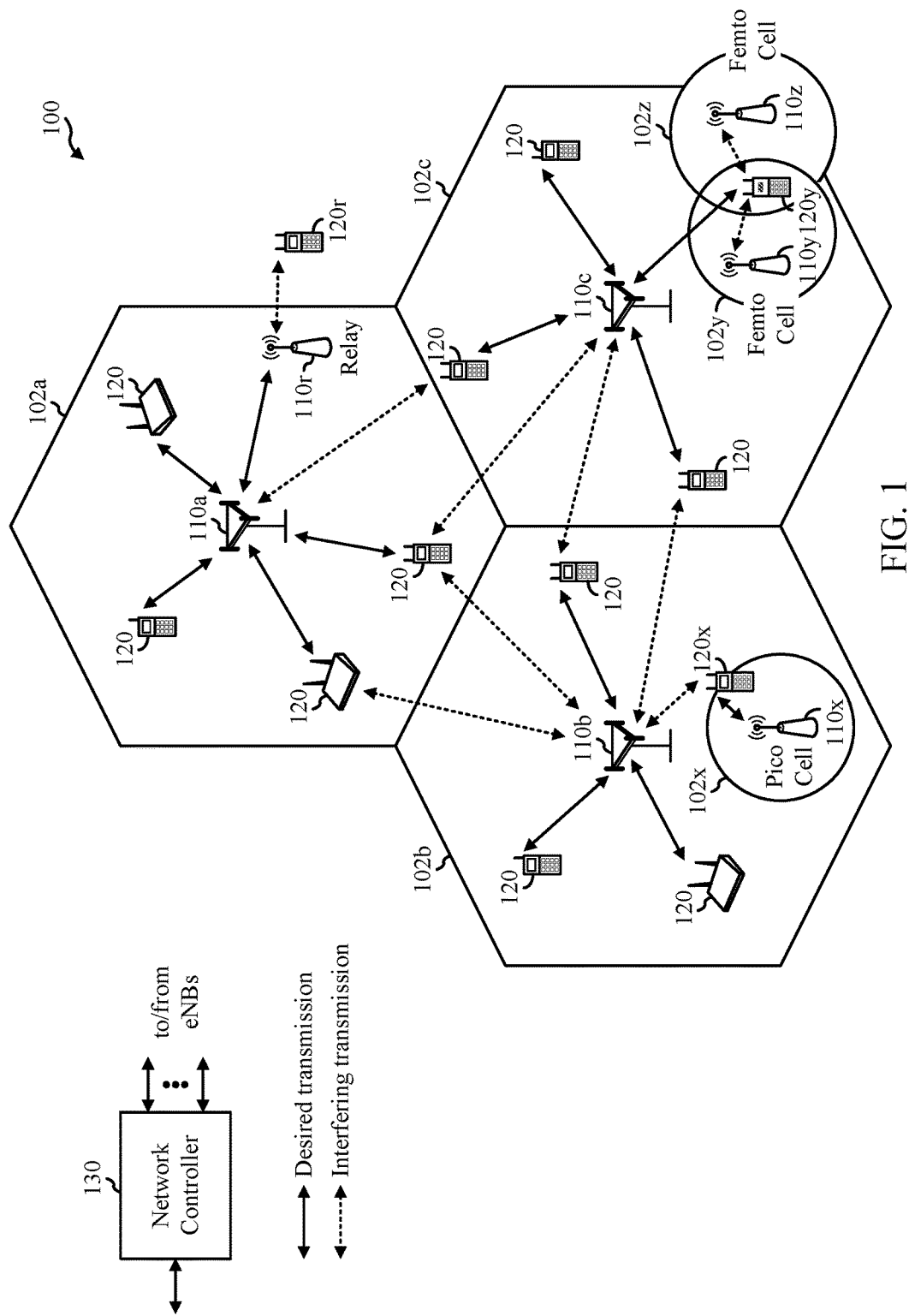
FIG. 1 is a block diagram conceptually illustrating an example wireless communication system, according to aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure provide apparatus, methods, processing systems, and computer program products for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). NR may support carrier aggregation (CA).

Aspects of the present disclosure provide techniques and apparatus for carrier switching handling for NR. For example, aspects of the present disclosure provide apparatus, methods, processing systems, and computer program products for transmission interruption handling due to carrier switching for uplink reference signal (e.g., sounding reference signal (SRS)) transmission and for a carrier switching capability indication. As will be described in further detail herein, a UE can interrupt communication on a first component carrier (CC) to switch to a second CC to transmit an uplink reference signal on the second CC. The UE can adjust one or more parameters (e.g., parameter values) of an uplink transmission on the first CC to account for (e.g., compensate) the interruption. In aspects, the UE can receive a query from a base station (BS) for switching capability information of the UE for one or more carrier aggregation (CA) configurations and, in response to the query, provide an indication to the BS of the switching capability information of the UE for the one or more CA configurations.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development in conjunction with the 5G Technology Forum (5GTF). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as NR, including 5G and later.

Example Wireless Communications System

FIG. 1 shows a wireless communication system 100 in which aspects of the present disclosure may be practiced. For example, wireless communication system 100 may be a new radio (NR) or 5G network. Wireless communication system 100 may include a UE 120 configured to interrupt communication on a first component carrier (CC) to switch between the first CC and a second CC to transmit an uplink reference signal (e.g., sounding reference signal (SRS)) on the second CC. The UE 120 can adjust one or more parameters or parameter values of an uplink transmission on the first component carrier to account for the interruption. The UE 120 can receive a query from a base station (BS) 110 for switching capability information of the UE 120 for one or more carrier aggregation (CA) configurations. In response to the query, the UE 120 can provide an indication to the BS 110 of the switching capability information of the UE 120 for the one or more CA configurations.

Wireless communication system 100 may include a number of BSs 110 and other network entities. A BS 100 may be a station that communicates with the UEs 120 and may also be referred to as a NR BS, 5G BS, node B (NB), enhanced/evolved NB (eNB), 5G NB, gNB, access point (AP), transmission reception point (TRP), etc.

Wireless communication system 100 may be a heterogeneous network that includes BSs of different types, e.g., macro eNodeBs, pico eNodeBs, femto eNodeBs, relays, etc. These different types of BS may have different transmit power levels, different coverage areas, and different impact on interference in the wireless communication system 100. For example, macro BSs may have a high transmit power level (e.g., 20 Watts) whereas pico BSs, femto BSs and relays may have a lower transmit power level (e.g., 1 Watt).

Each BS 110 may provide communication coverage for a particular geographic area. In 3GPP, the term "cell" can refer to a coverage area of a BS and/or a BS subsystem serving this coverage area, depending on the context in which the term is used. A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In wireless communication system 100, BSs 110a, 110b and 110c may be macro BSs for the macro cells 102a, 102b and 102c, respectively. BS 110x may be a pico BS for a pico cell 102x. BSs 110y and 110z may be femto BSs for the femto cells 102y and 102z, respectively. A BS may support one or multiple (e.g., three) cells.

Wireless communication system 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In wireless communication system 100, relay station 110r may communicate with BS 110a and a UE 120r in order to facilitate communication between the BS 110a and the UE 120r. A relay station may also be referred to as a relay BS, a relay, etc.

Wireless communication system 100 may support synchronous or asynchronous operation. For synchronous operation, BSs 110 may have similar frame timing, and transmissions from different BSs may be approximately aligned in time. For asynchronous operation, BSs 110 may have different frame timing, and transmissions from different eNodeBs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly via wireless or wireline backhaul).

UEs 120 (e.g., 120x, 120y, etc.) may be dispersed throughout the wireless network 100, and each UE may be stationary or mobile. A UE may also be referred to as a terminal, a mobile station, a subscriber unit, a station, a Customer Premises Equipment (CPE), etc. A UE may be a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

A UE may be able to communicate with macro BSs, pico BSs, femto BSs, relays, etc. In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, frequency tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., referred to as a "resource block" (RB)) may be 12 subcarriers (or 180 kHz). Thus, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 RBs), and there may be 1, 2, 4, 8 or 16 subbands for system bandwidth of 1.25, 2.5, 5, 10 or 20 MHz, respectively.

In some examples, access to the air interface may be scheduled, wherein a scheduling entity (e.g., a BS) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
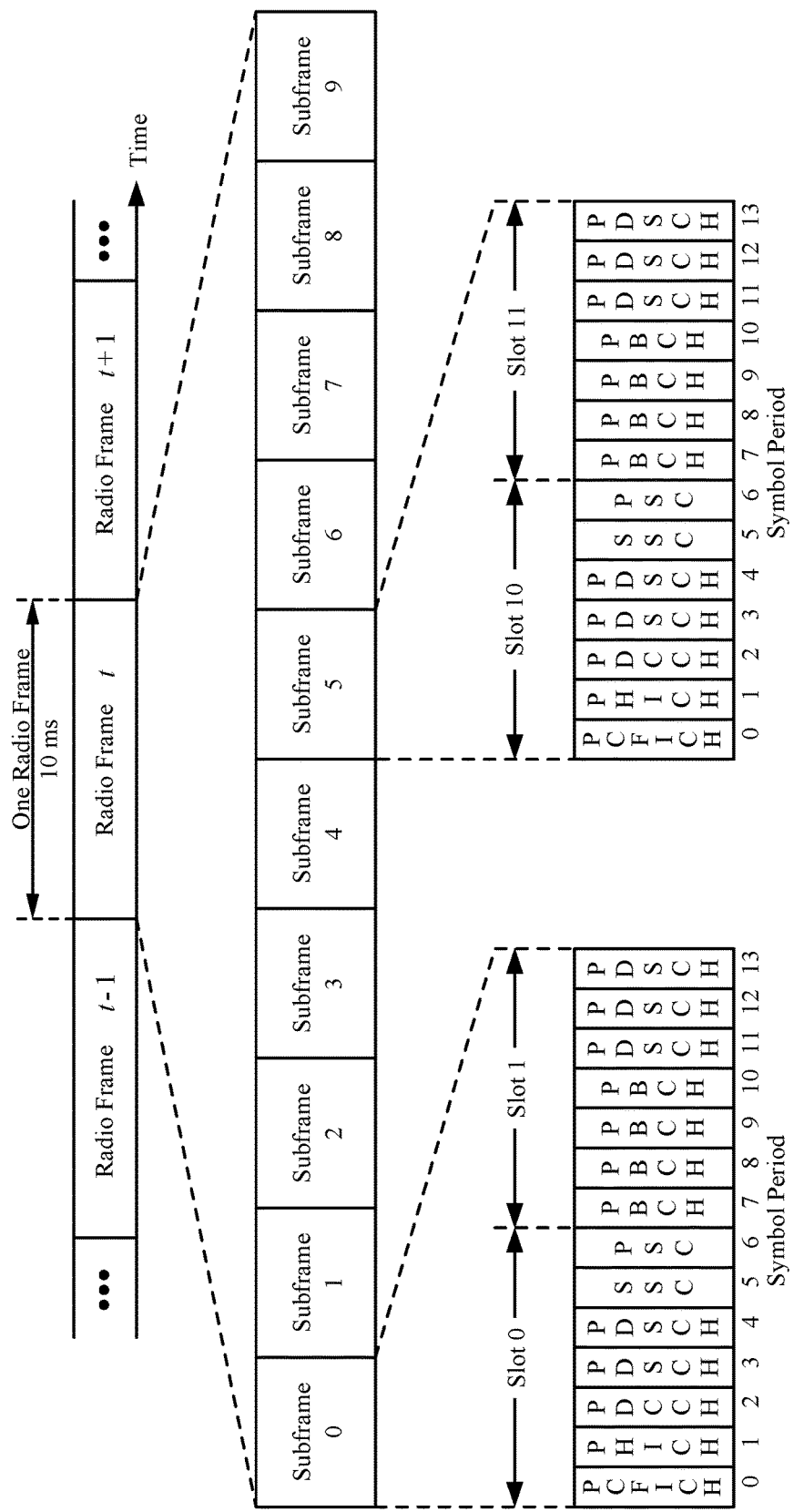
FIG. 2 is a block diagram conceptually illustrating an example downlink frame structure in a wireless communication system, according to aspects of the present disclosure.

FIG. 2 shows a downlink frame structure used in certain wireless communication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L–1. The available time frequency resources may be partitioned into RBs. Each RBs may cover N subcarriers (e.g., 12 subcarriers) in one slot.

In certain wireless communication systems (e.g., LTE), a BS may send a primary synchronization signal (PSS) and a secondary synchronization signal (SSS) for each cell in the BS. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The BS may send a Physical Broadcast Channel (PBCH) in symbol periods 0 to 3 in slot 1 of sub-frame 0. The PBCH may carry certain system information.

The BS may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 RBs. In the example shown in FIG. 2, M=3. The BS may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The BS may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The BS may send the PSS, SSS and PBCH in the center 1.08 MHz of the system bandwidth used by the BS. The BS may send the PCFICH and PHICH across the entire system bandwidth in each symbol period in which these channels are sent. The BS may send the PDCCH to groups of UEs in certain portions of the system bandwidth. The BS may send the PDSCH to specific UEs in specific portions of the system bandwidth. The BS may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements (REs) may be available in each symbol period. Each RE may cover one subcarrier in one symbol period and may be used to send one modulation symbol, which may be a real or complex value. REs not used for a reference signal in each symbol period may be arranged into resource element groups (REGs). Each REG may include four REs in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A BS may send the PDCCH to the UE in any of the combinations that the UE will search.

A UE may be within the coverage of multiple BSs. One of these BSs may be selected to serve the UE. The serving BS may be selected based on various criteria such as received power, path loss, signal-to-noise ratio (SNR), etc.

Figure 3:
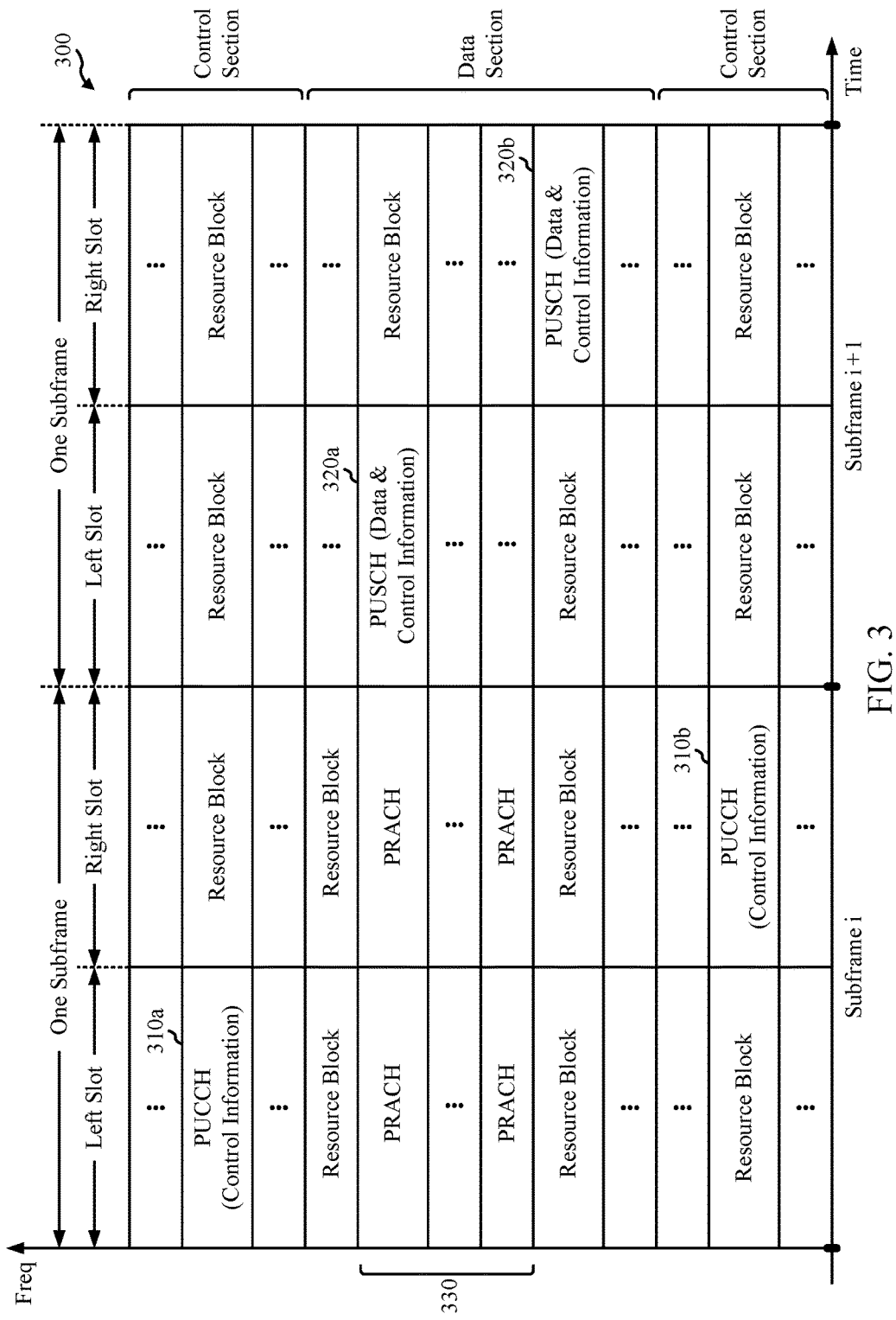
FIG. 3 is a diagram illustrating an example uplink frame structure in a wireless communication system, according to aspects of the present disclosure.

FIG. 3 is a diagram illustrating an example of an uplink frame structure 300 in a wireless communication system (e.g., LTE). The available RBs for the UL may be partitioned into a data section and a control section. The control section may be formed at the two edges of the system bandwidth and may have a configurable size. The RBs in the control section may be assigned to UEs for transmission of control information. The data section may include all RBs not included in the control section. The UL frame structure results 300 in the data section including contiguous subcarriers, which may allow a single UE to be assigned all of the contiguous subcarriers in the data section.

A UE may be assigned RBs 310a, 310b in the control section to transmit control information to a BS. The UE may also be assigned RBs 320a, 320b in the data section to transmit data to the BS. The UE may transmit control information in a physical UL control channel (PUCCH) on the assigned RBs in the control section. The UE may transmit only data or both data and control information in a physical UL shared channel (PUSCH) on the assigned RBs in the data section. An UL transmission may span both slots of a subframe and may hop across frequency.

A set of RBs may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive RBs. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms). In accordance with aspects of the present disclosure, one or more of the above-described resources may be allocated and/or employed in a different manner.

Figure 4:
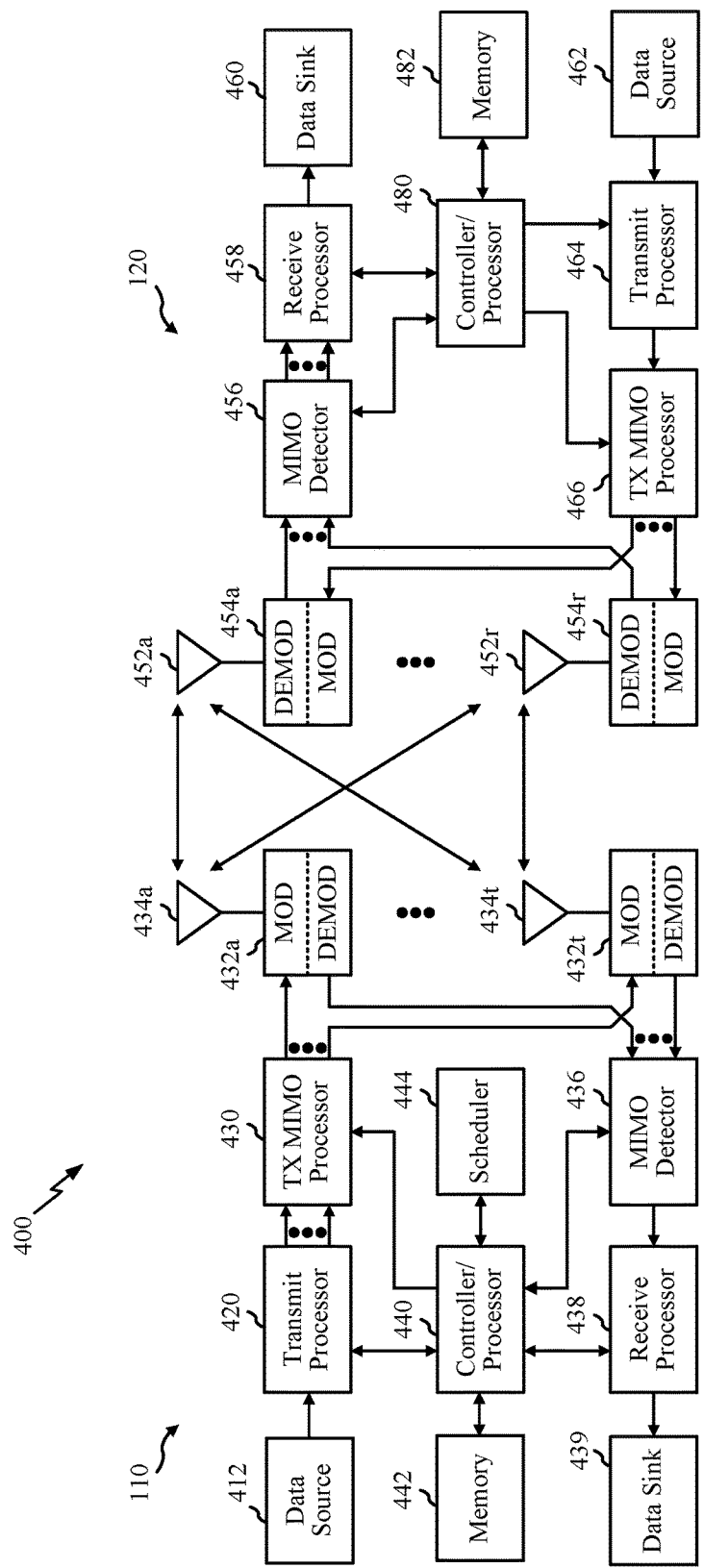
FIG. 4 is a block diagram conceptually illustrating a design of an example base station (BS) and user equipment (UE), according to aspects of the present disclosure.

FIG. 4 illustrates example components of the BS 110 and UE 120 illustrated in FIG. 1, which may be used to implement aspects of the present disclosure. For example, antennas 452, TX MIMO processor 466, receive processor 458, transmit processor 464, and/or controller/processor 480 of the UE 120 may be used to perform the operations described herein and illustrated with reference to FIGS. 13 and 17. For example, antennas 434, TX MIMO processor 430, transmit processor 420, receive processor 438, and/or controller/processor 440 of the BS 110 may be used to perform the operations described herein and illustrated with reference to FIG. 16 or complementary operations associated therewith.

At BS 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At UE 120, the antennas 452a through 452r may receive the downlink signals from BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for UE 120 to a data sink 460, and provide decoded control information to a controller/processor 480.

On the uplink, at UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At BS 110, the uplink signals from the UE 120 may be received by the antennas 434, processed by the modulators 432, detected by a MIMO detector 436 if applicable, and further processed by a receive processor 438 to obtain decoded data and control information sent by UE 120. The receive processor 438 may provide the decoded data to a data sink 439 and the decoded control information to the controller/processor 440.

The controller/processors 440 and 480 may direct the operation at BS 110 and UE 120, respectively. The controller/processor 440 and/or other processors and modules at BS 110 may perform or direct, e.g., the execution of various processes for the techniques described herein. The controller/processor 480 and/or other processors and modules at UE 120 may also perform or direct, e.g., the execution of the functional blocks illustrated in FIGS. 13, 16, and 17, and/or other processes for the techniques described herein. The memories 442 and 482 may store data and program codes for the base station 110 and the UE 120, respectively. A scheduler 444 may schedule UEs for data transmission on the downlink and/or uplink.

Example NR/5G RAN Architecture

In NR networks, a single component carrier bandwidth of 100 MHz may be supported. NR resource blocks (RBs) may span 12 subcarriers with a subcarrier bandwidth of 75 kHz over a 0.1 ms duration. Each radio frame may consist of 50 subframes (or slots) with a length of 10 ms. Consequently, each subframe may have a length of 0.2 ms. Each subframe may indicate a link direction (i.e., downlink, uplink or sidelink) for data transmission and the link direction for each subframe may be dynamically switched. Each subframe may include DL/UL data as well as DL/UL control data. UL and DL subframes for NR may be as described in more detail below with respect to FIGS. 5 and 6.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units (CUs) or distributed units (DUs).

The NR radio access network (RAN) may include a CU and one or more DUs. A NR BS (e.g., referred to as a gNB, 5G Node B, NB, eNB, transmission reception point (TRP), access point (AP), etc.) may correspond to one or multiple BSs. NR cells can be configured (e.g., by the RAN) as access cells (ACells) or data only cells (DCells). DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 5:
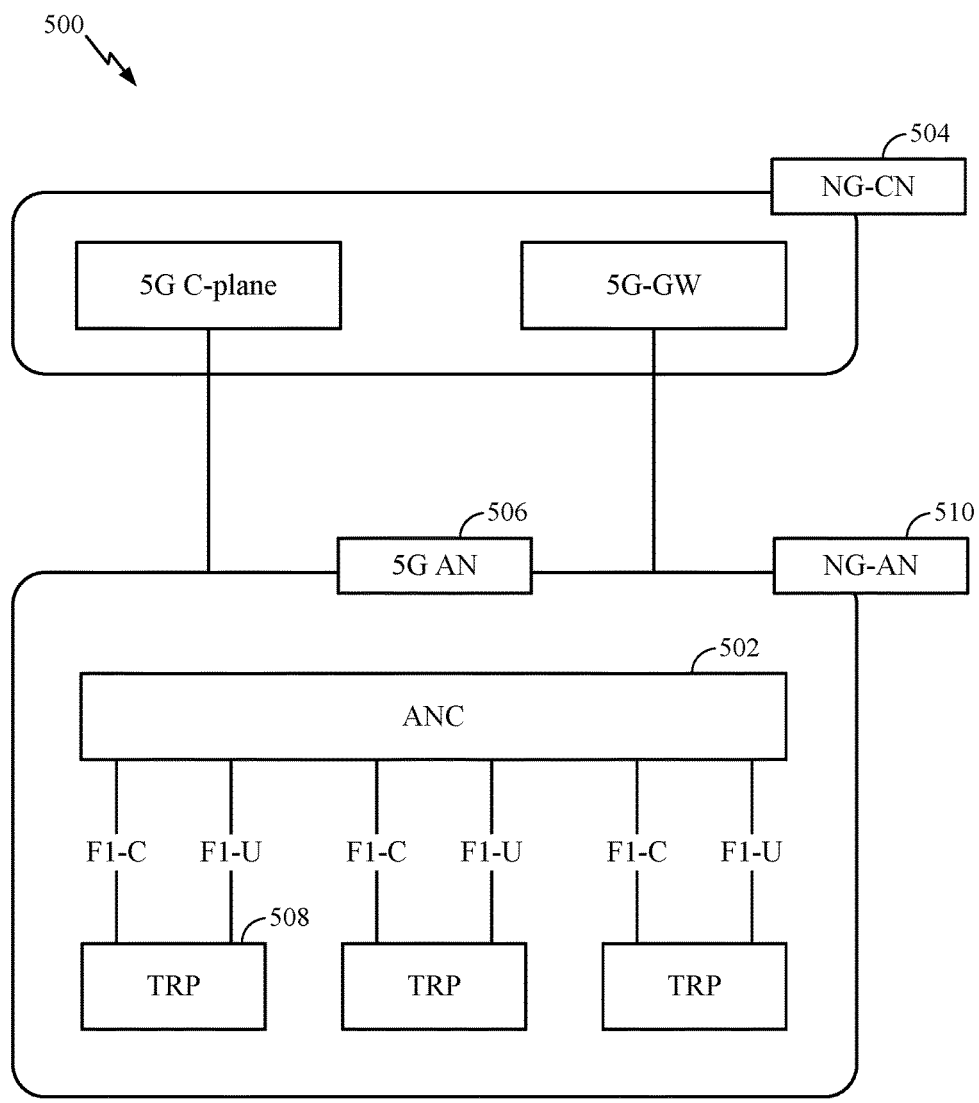
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. ANC 502 may be a CU of the distributed RAN 500. The backhaul interface to the next generation core network (NG-CN) 304 may terminate at ANC 502. The backhaul interface to neighboring next generation access nodes (NG-ANs) 51—may terminate at ANC 502. ANC 502 may include one or more TRPs 508.

TRPs 508 may be a DU. TRPs 508 may be connected to one ANC (e.g., ANC 502) or more than one ANC (not illustrated). For example, for RAN sharing, radio as a service (RaaS), and service specific AND deployments, the TRP may be connected to more than one ANC. A TRP may include one or more antenna ports. TRPs 508 may be configured to individually (e.g., dynamic selection) or jointly (e.g., joint transmission) serve traffic to a UE.

The logical architecture of the distributed RAN 500 may support fronthauling solutions across different deployment types. For example, the architecture may be based on transmit network capabilities (e.g., bandwidth, latency, and/or jitter). The logical architecture of the distributed RAN 500 may share features and/or components with LTE. For example, the NG-AN 510 may support dual connectivity with NR. NG-AN 510 may share a common fronthaul for LTE and NR.

The logical architecture of distributed RAN 500 may enable cooperation between and among TRPs 508. For example, cooperation may be within a TRP and/or across TRPs via ANC 502. An inter-TRP interface may not be present.

The logical architecture of a distributed RAN 500 may include a dynamic configuration of split logical functions. For example, packet data convergence protocol (PDCP), radio link control (RLC) protocol, and/or medium access control (MAC) protocol may be adaptably placed at ANC 502 or TRP 508.

Figure 6:
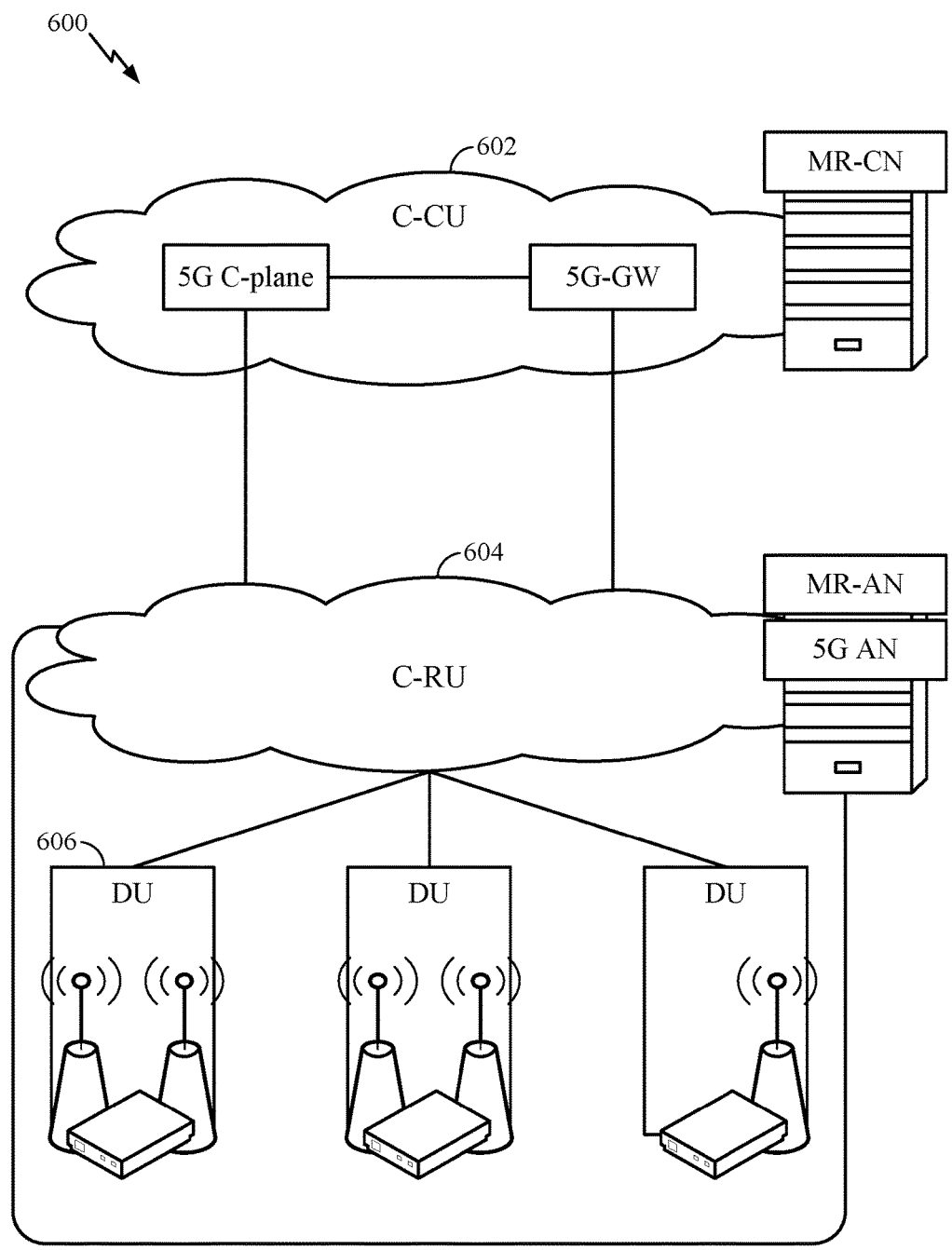
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. C-CU 602 may be centrally deployed. C-CU 602 functionality may be offloaded (e.g., to advanced wireless services (AWS)), in an effort to handle peak capacity. A centralized RAN unit (C-RU) 604 may host one or more ANC functions. Optionally, C-RU 604 may host core network functions locally. C-RU 604 may have distributed deployment. C-RU 604 may be located near the network edge. DU 606 may host one or more TRPs. DU 604 may be located at edges of the network with radio frequency (RF) functionality.

Figure 7:
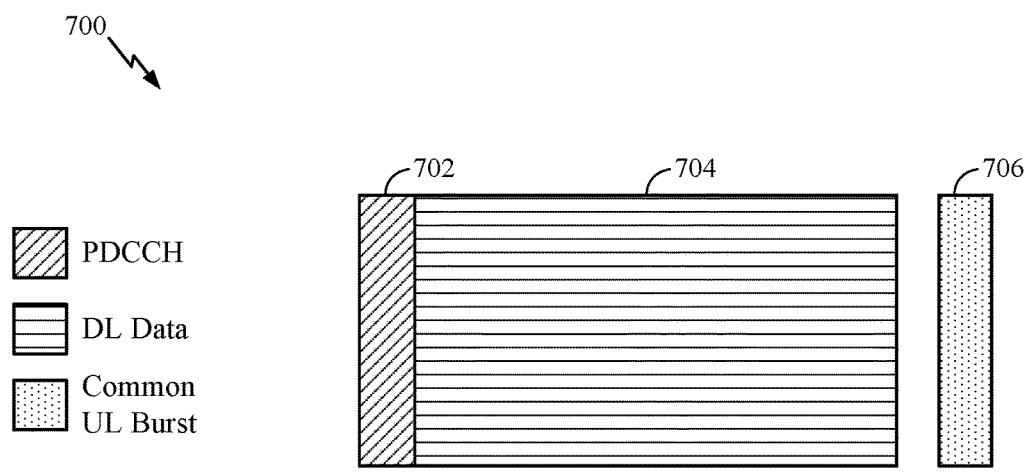
FIG. 7 is a diagram illustrating an example of a downlink-centric slot, in accordance with certain aspects of the present disclosure.

FIG. 7 is a diagram showing an example of a DL-centric slot 700. DL-centric slot 700 may include a control portion 702. The control portion 702 may exist in the initial or beginning portion of DL-centric slot 700. The control portion 702 may include various scheduling information and/or control information corresponding to various portions of DL-centric slot 700. In some configurations, the control portion 702 may be a physical DL control channel (PD-CCH), as shown in FIG. 7. DL-centric slot 700 may also include a DL data portion 704. The DL data portion 504 may be referred to as the payload of DL-centric slot 700. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

DL-centric slot 700 may also include a common UL portion 706. The common UL portion 706 may sometimes be referred to as an UL burst, a common UL burst, and/or various other suitable terms. The common UL portion 706 may include feedback information corresponding to various other portions of DL-centric slot 700. For example, the common UL portion 706 may include feedback information corresponding to the control portion 702. Non-limiting examples of feedback information may include an ACK signal, a NACK signal, a HARQ indicator, and/or various other suitable types of information. The common UL portion 706 may include additional or alternative information, such as information pertaining to random access channel (RACH) procedures, scheduling requests (SRs), and various other suitable types of information. As illustrated in FIG. 7, the end of the DL data portion 704 may be separated in time from the beginning of the common UL portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric slot and alternative structures having similar features may exist without necessarily deviating from the aspects described herein.

Figure 8:
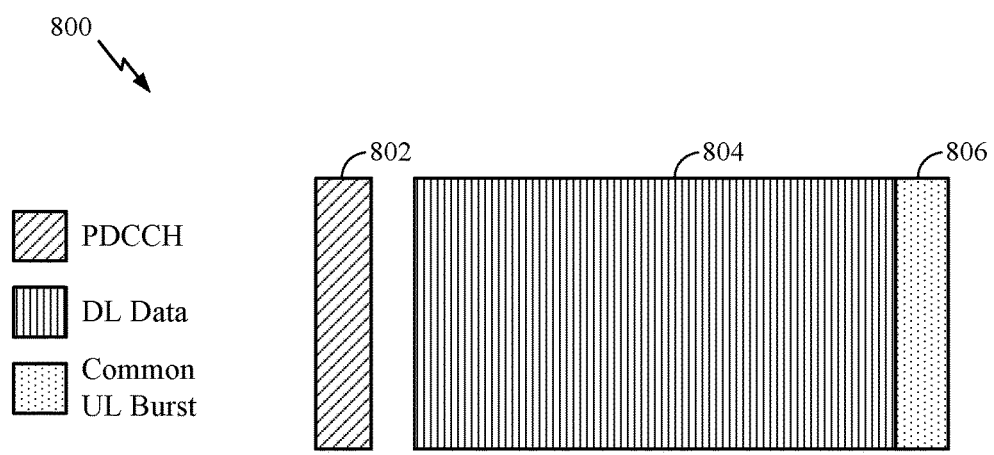
FIG. 8 is a diagram illustrating an example of an uplink-centric slot, in accordance with certain aspects of the present disclosure.

FIG. 8 is a diagram showing an example of an UL-centric slot 800. UL-centric slot 800 may include a control portion 802. The control portion 802 may exist in the initial or beginning portion of UL-centric slot 800. The control portion 802 in FIG. 8 may be similar to the control portion 702 described above with reference to FIG. 7. UL-centric slot 800 may also include an UL data portion 804. The UL data portion 804 may sometimes be referred to as the payload of UL-centric slot 800. The UL portion may refer to the communication resources utilized to communicate UL data from the subordinate entity (e.g., UE) to the scheduling entity (e.g., UE or BS). In some configurations, the control portion 802 may be a physical UL shared channel (PUSCH).

As illustrated in FIG. 8, the end of the control portion 802 may be separated in time from the beginning of the UL data portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). UL-centric slot 800 may also include a common UL portion 806. The common UL portion 806 in FIG. 8 may be similar to the common UL portion 706 described above with reference to FIG. 7. The common UL portion 806 may additionally or alternatively include information pertaining to channel quality indicator (CQI), sounding reference signals (SRSs), and various other suitable types of information. The foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Carrier Aggregation

Figure 9:
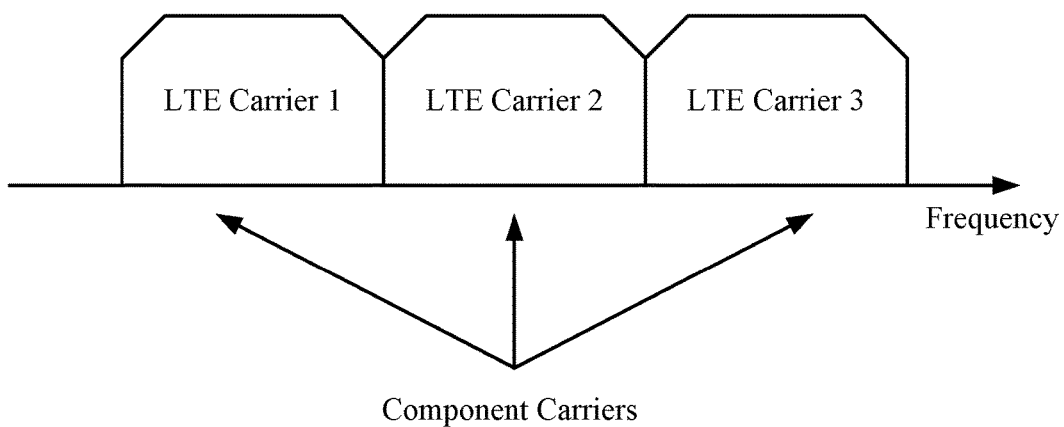
FIG. 9 illustrates an example contiguous carrier aggregation type, according to aspects of the present disclosure.
Figure 10:
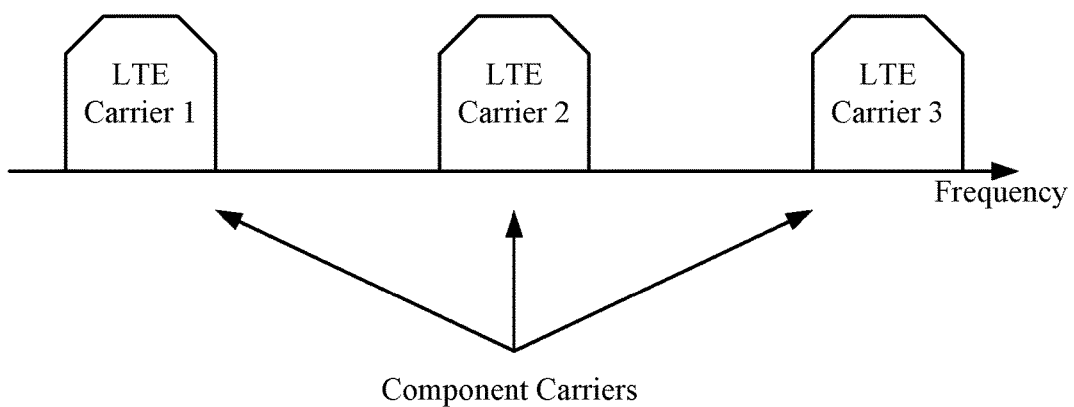
FIG. 10 illustrates an example non-contiguous carrier aggregation type, according to aspects of the present disclosure.

In certain systems (e.g., LTE-Advanced), UEs may use spectrum of up to 20 MHz bandwidths allocated in a carrier aggregation of up to a total of 100 MHz (5 CCs) used for transmission in each direction. Two types of carrier aggregation include contiguous CA and non-contiguous CA. In contiguous CA, multiple available CCs are adjacent to each other as shown in FIG. 9. In non-contiguous CA multiple available CCs are separated along the frequency band as shown in FIG. 10. Both non-contiguous and contiguous CA aggregate multiple CCs to serve a single UE.

In some cases, a UE operating in a multicarrier system (a system supporting CA) can be configured to aggregate certain functions of multiple carriers, such as control and feedback functions, on the same carrier, which may be referred to as a "primary carrier" (PCC). The remaining carriers that depend on the primary carrier for support are referred to as associated secondary carriers (SCC).

Example Handling for Interruption Due to Carrier Switching and Carrier Switching Capability Indication In certain systems (e.g., long term evolution (LTE) systems), a user equipment (UE) can be configured with up to 32 component carriers (CC) for carrier aggregation (CA). Each CC may be up to 20 MHz in size (e.g., and may be backward compatible). Therefore, up to 640 MHz of bandwidth can be configured for a UE (e.g., 32 CC×20 MHz per CC) for carrier aggregation.

The CCs in CA can be all be configured as frequency division duplexing (FDD) CCs, can all be configured as time division duplexing (TDD) CCs, or configured as a mixture of FDD CCs and TDD CCs. Different TDD CCs may have the same or different downlink uplink (DL/UL) configurations. Special subframes can also be configured differently for different TDD CCs.

In an example CA configuration, one CC can be configured as the primary CC (e.g., referred to as the Pcell or PCC) for the UE and at another CC can be configured as the primary secondary CC (e.g., referred to as the pScell). Only the Pcell and pScell may carry the physical uplink control channel (PUCCH). The UE may monitor common search space only on the Pcell. All other CCs may be referred to as secondary CCs (SCCs). CCs can be configured for uplink only, downlink only, or for both uplink and downlink.

In certain systems (e.g., Release 14 LTE systems or beyond), carrier switching may be supported, for example, for uplink reference signal transmission. For example, the UE may perform carrier switching for sounding reference signal (SRS) transmission. SRS is a reference signal transmitted by the UE in the uplink direction. SRS may be used by the base station (BS) to estimate the uplink channel quality over a wider bandwidth. The BS may use this information for uplink frequency selective scheduling for both downlink and uplink. Carrier switching may involve the UE switching between transmissions on one CC to SRS transmission on a different CC, and then back to the first CC to resume transmission.

Carrier switching may involve a switching time for the switching between the transmitting on the first CC to the SRS on the other CC, and switching back to the first CC. The switching can be between different TDD CCs, different FDD CCs, TDD and FDD CCs. The particular CCs the UE switches between as well as capabilities of the UE can affect the switching time involved.

To support carrier switching between (e.g., to and/or from) TDD CCs, CCs available for SRS transmission can correspond to CCs available for CA of physical downlink shared channel (PDSCH). In this case, the UE may have fewer CCs available for CA of the physical uplink shared channel (PUSCH).

Figure 11:
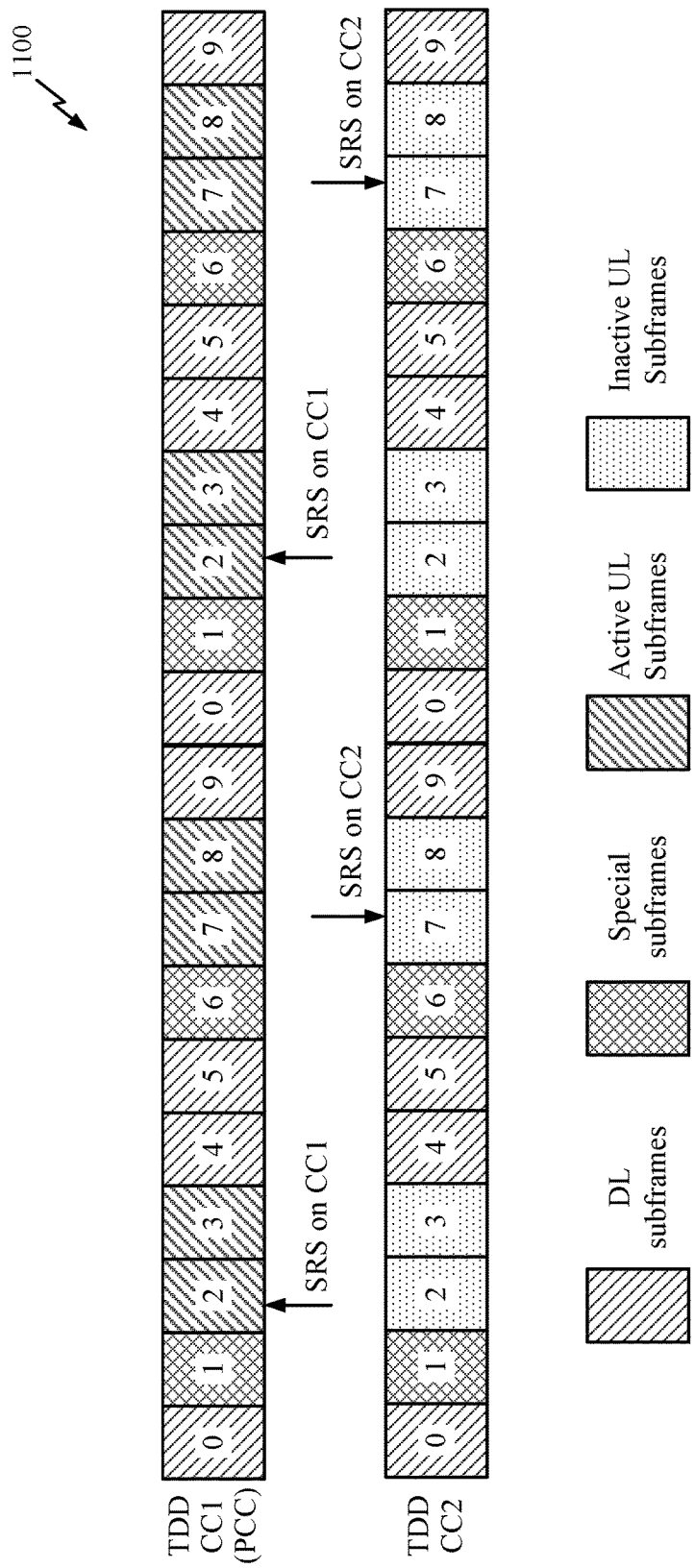
FIG. 11 is block diagram illustrating example time division duplexing (TDD) subframe configuration and sounding reference signal (SRS) transmission for two component carriers (CCs), in accordance with certain aspects of the present disclosure.

FIG. 11 is block diagram illustrating example subframe configurations for two component carriers (CCs), in accordance with certain aspects of the present disclosure. As shown in FIG. 11, the UE may be configured with at least TDD CC1 (e.g., the PCC) and TDD CC2. CC2 may be a TDD carrier configured only for DL. For example, as shown in FIG. 11, for TDD CC2, subframes 0, 4, 5, 9 are configured as downlink subframes; subframes 1 and 6 are configured as special subframes; and subframes 2, 3, 7, 8 are inactive uplink subframes (e.g., whereas for CC1, subframes 2, 3, 7, 8 are active uplink subframes). However, as described above, one or more of the above-described resources may be allocated and/or employed in a different manner. For example, in aspects, SRS for CC2 may be transmitted in the inactive uplink subframes (e.g., to exploit channel reciprocity) on CC2 (e.g., in subframe 7 in the example shown in FIG. 11).

Figure 12:
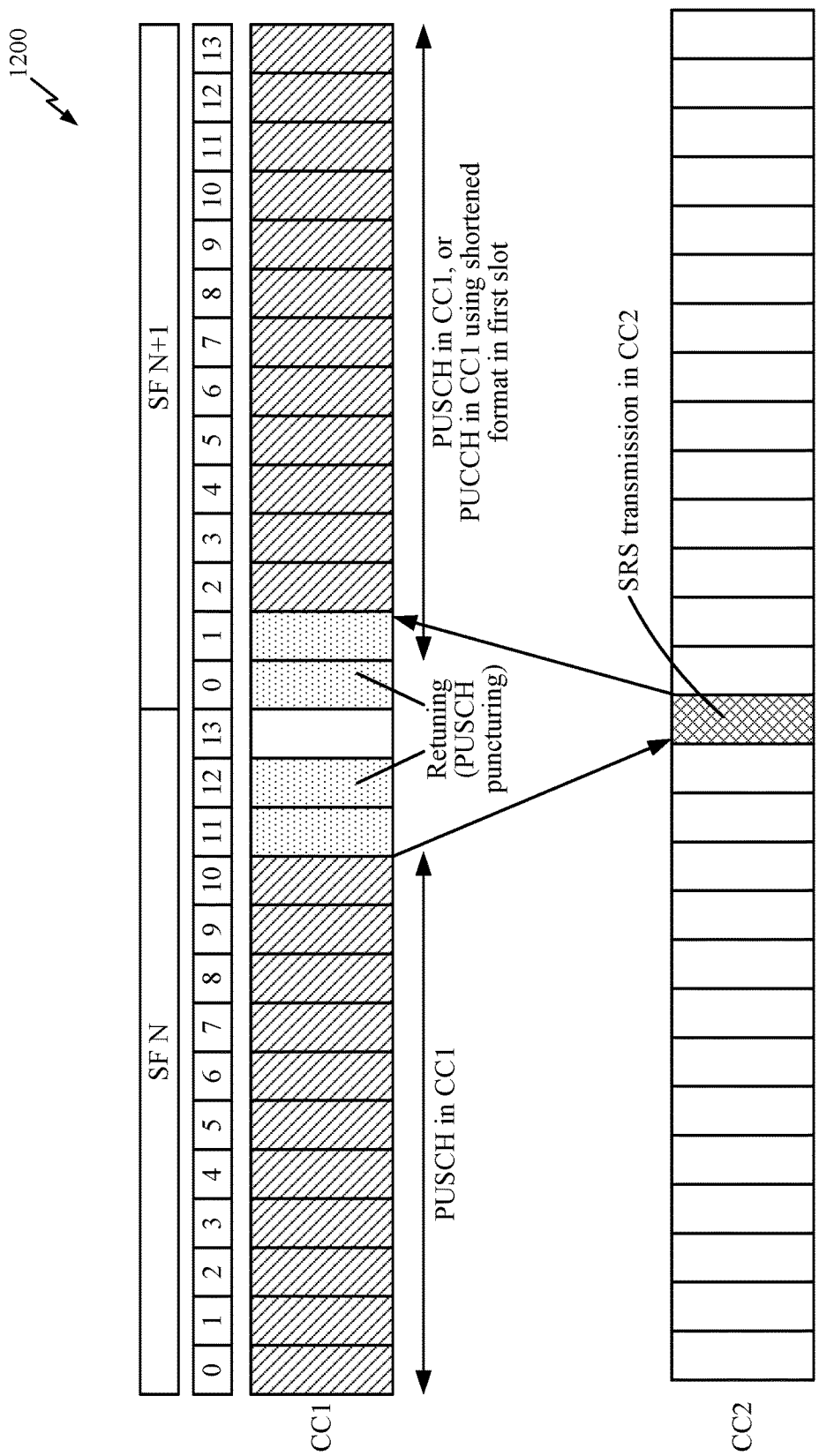
FIG. 12 is a block diagram illustrating example interruption of transmission on a first CC by SRS transmission on a second CC, in accordance with certain aspects of the present disclosure.

The SRS transmissions on CC2 may coincide with other transmissions, such as PUSCH or PUCCH, on CC1. In this case, the SRS transmission, and the associated switching time, in CC2 may interrupt the transmission in CC1. FIG. 12 is a block diagram illustrating example interruption by carrier switching for SRS transmission, in accordance with certain aspects of the present disclosure. In the example shown in FIG. 12, the SRS transmission on CC2 may cause the UE 120 to disregard, delete, puncture, drop and/or not process one or more symbols of the PUSCH or PUCCH transmission on CC1. For example, if the UE 120 has a switching time (e.g., including retuning time) of 2 symbols, a total of 5 symbols may be disregarded, deleted, punctured, dropped and/or not processed on CC1 because of the UE's interruption of communication on CC1 to switch between CC1 and CC2 to transmit SRS on CC2. For example, 2 symbols to switch from CC1 to CC2, one symbol for the SRS transmission, and 2 symbols to switch back from CC2 to CC1.

As mentioned above, the switching times may vary. For example, the switching time from one carrier to another carrier may depend on the UE capability, whether the switching is between contiguous or non-contiguous carriers, whether the switching is inter-band, etc. If the UE switches to a contiguous carrier, the UE may only adjust a reduced amount of logic, such as retuning the local oscillator (LO), for example, which may take less than 3 symbols as compared to switching between non-contiguous carriers. For inter-band switching, the UE may adjust a larger amount of logic such as retuning the LO and also reconfiguring the power amplifier (PA).

Also, interrupting (e.g., puncturing) PUSCH may impact uplink control information (UCI) transmitted over PUSCH. It may also be desirable for the UE to be able to indicate to the BS the switching time and/or support for switching between different carriers of the UE.

Accordingly, what is needed are techniques and apparatus for handling of interruption of a transmission due to carrier switching for uplink reference signal transmission and for a carrier switching capability indication.

Figure 13:
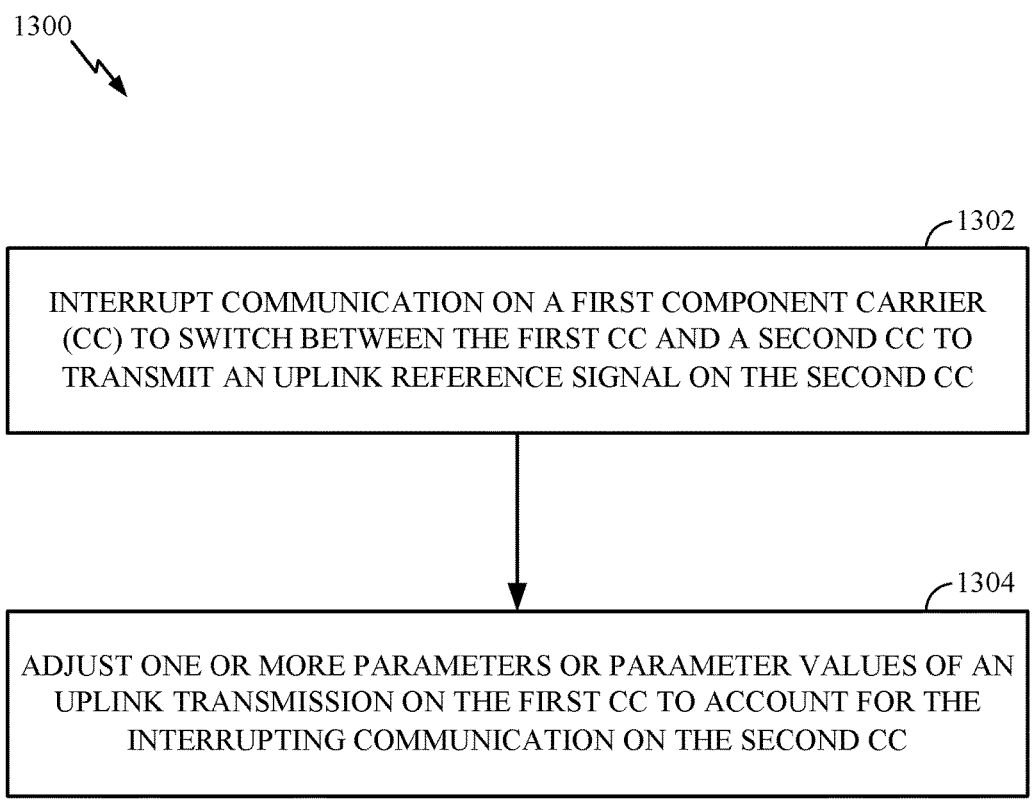
FIG. 13 is a flow diagram illustrating example operations for adjusting parameters (e.g., values) for an uplink transmission based on SRS interruption, according to aspects of the present disclosure.

FIG. 13 is a block diagram illustrating example operations 1300 for adjusting transmission parameters (e.g., values thereof) of an uplink transmission based on an interruption caused by an uplink reference signal, such as SRS, according to aspects of the present disclosure. Operations 1300 may be performed, for example, by a UE (e.g., UE 120). Operations 1300 may begin, at 1302, by interrupting communication on a first CC to switch between the first CC and a second CC to transmit an uplink reference signal (e.g., SRS) on the second CC. At 1304, the UE adjusts one or more parameters (e.g., transmit power level, transmission resources, number of REs, power parameter value) of an uplink transmission (e.g., PUSCH, PUCCH, UCI) on the first CC to account for the interrupting communication on the first CC (e.g., including interrupting caused by switching time (e.g., including retuning time) from the first CC to the second CC and back to the first CC). In aspects, the uplink reference signal can be sent on the second CC in a subframe configured for downlink transmission only. The adjusted parameter values can be determined explicitly or implicitly.

Example Power Control Based on Carrier Switching Interruption

Interruption such as puncturing may result in performance loss. For example, puncturing part of the uplink transmission may increase the block error rate (BLER) of the punctured transmission. For low data rate channel, for example, puncturing 3 symbols out of 14 (e.g., in a subframe) may imply a 3/14 loss, which may correspond to around 1 dB loss.

According to certain aspects, the UE may modify power control of transmissions on a first CC that the UE 120 interrupts (e.g., puncture) caused by carrier switching to transmit the SRS on the second CC. For example, the UE may take into account the symbols lost (e.g., punctured) due to the switching time when deciding the transmit power for transmission of signals affected by the puncturing. In one example implementation, if carrier switching (e.g., retuning) is performed, the UE may increase the maximum transmit power, once the interrupted transmission resumes, to compensate for the loss. For the example given above of 3/14 loss (1 dB), the UE may increase the transmit power by 1 dB for the interrupted transmission.

In aspects, a parameter, which can be denoted as Δswitch, may be added to the power control formula. The Δswitch provides the increased transmit power offset to compensate for carrier switching (e.g., in the above example, Δswitch takes the value 1 dB) and takes the value of 0 if carrier switching is not performed. If multiple retuning times are supported, the power control modification may be different for the different retuning times. In one example, if a 3 symbol retuning time and a 1 slot retuning time are supported, then the parameter $\Delta_{switch}$ may be equal to 1 dB for the 3 symbol retuning time, but the parameter Δswitch may be equal to 3 dB for the 1 slot retuning time. The power control may be performed for PUSCH and/or PUCCH. An example formula for power control may be given by the equation below:

$$P_{PUSCH,c}(i) = \min\{P_{CMAX,c}(i), 10 \log_{10}((M_{PUSCH,c}(i)) + P_{O\_PUSCH,c}(j) + \alpha_c(j) \cdot PL_c + \Delta_{TF,c}(i) + f_c(i) + \Delta_{switch,c}(i),$$

where $P_{CMAX}$ is the maximum transmit power of the UE, $M_{PUSCH}$ is the number of PRBs for PUSCH/SRS transmission, $P_{O\_PUSCH}$ is the target power spectral density (PSD) of PUSCH transmission, a is a weighting parameter for the path loss, PL is the pathloss estimate, $\Delta_{TF}$ is a parameter to compensate for UCI transmission, $f_c$ is the closed loop power control parameters, and $\Delta_{switch}$ is the power control offset parameter.

Example Rate Matching Based on Carrier Switching Interruption

Figure 14:
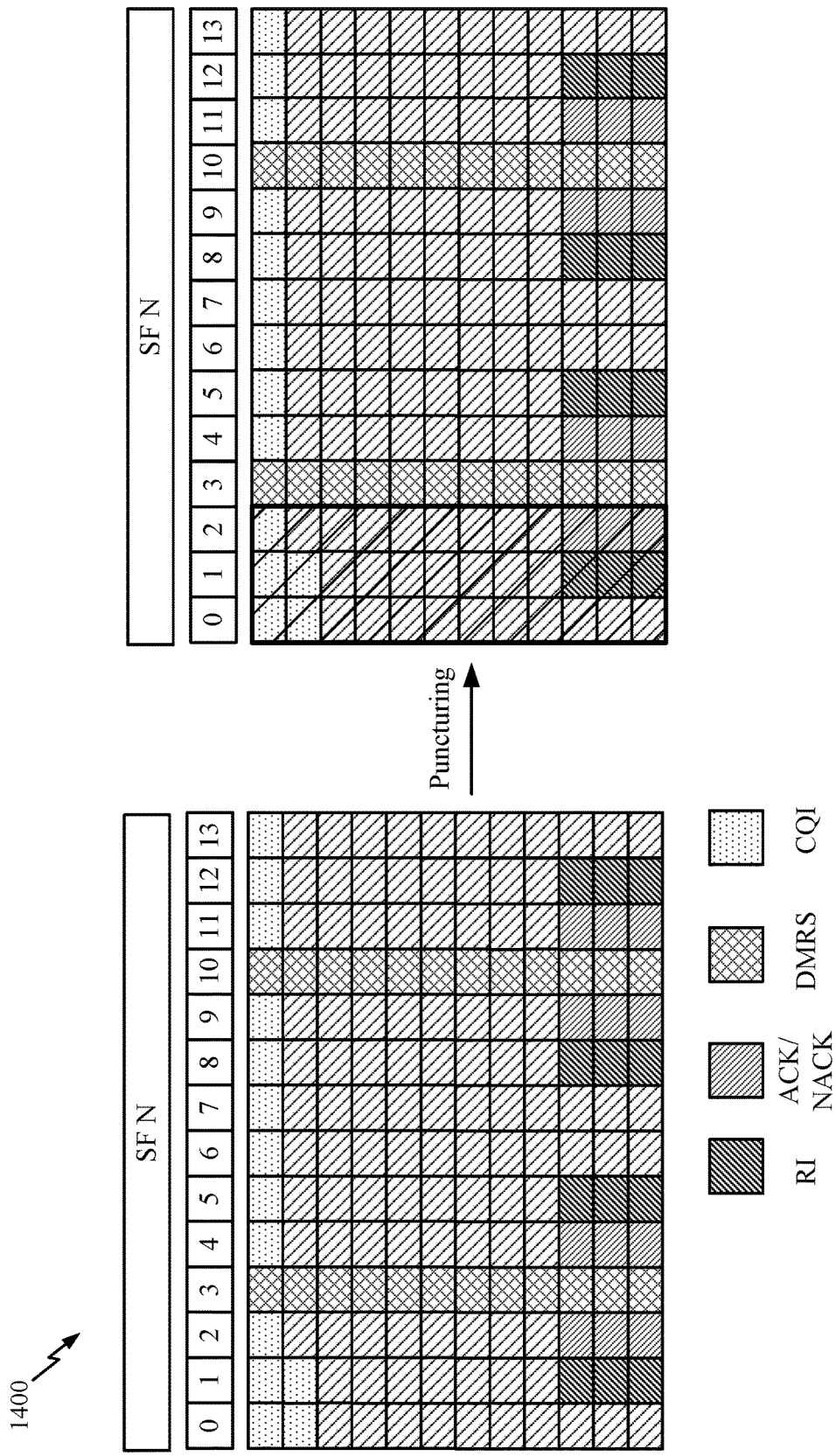
FIG. 14 is a block diagram illustrating resource elements for transmission of control information interrupted by SRS switching, in accordance with certain aspects of the present disclosure.

According to certain aspects, interruption of a transmission due to carrier switching (e.g., SRS puncturing) may be handled by using different rate matching values. As shown in FIG. 14, in some cases, the switching between CCs for SRS transmission may affect symbols for uplink control information (CSI), transmitted over PUSCH. In the example shown in FIG. 14, the RI in symbol 1 and ACK/NACK is transmitted in symbol 2 of the subframe 1400 are punctured by SRS transmission and/or the associated switching timing. According to certain aspects, power control can be performed for the remaining UCI symbols (e.g., the RI and ACK/NACK in symbols 4, 5, 8, 9, 11, and 12). The power control may be performed according to the power control techniques described above; however, there may be dimensionality issues (e.g., the code rate may be too high). Thus, in addition or alternatively to power control, rate matching may be used to handle interruption of the UCI symbols (e.g., to compensate for previously-interfered UCI symbols).

According to certain aspects, the number of resource elements (REs) available for UCI may be determined/adjusted based on the interruption (e.g., puncturing). For example, if the UCI symbols are punctured, additional REs may be used for transmission of the UCI in the remainder of the subframe. As shown in FIG. 14, the UCI in symbols 1 and 2 are punctured by the SRS switching, therefore, in this example, three REs of RI and 3 REs of ACK/NAK are lost so additional REs can be used for the remaining RI and ACK/NACK transmissions.

Figure 15:
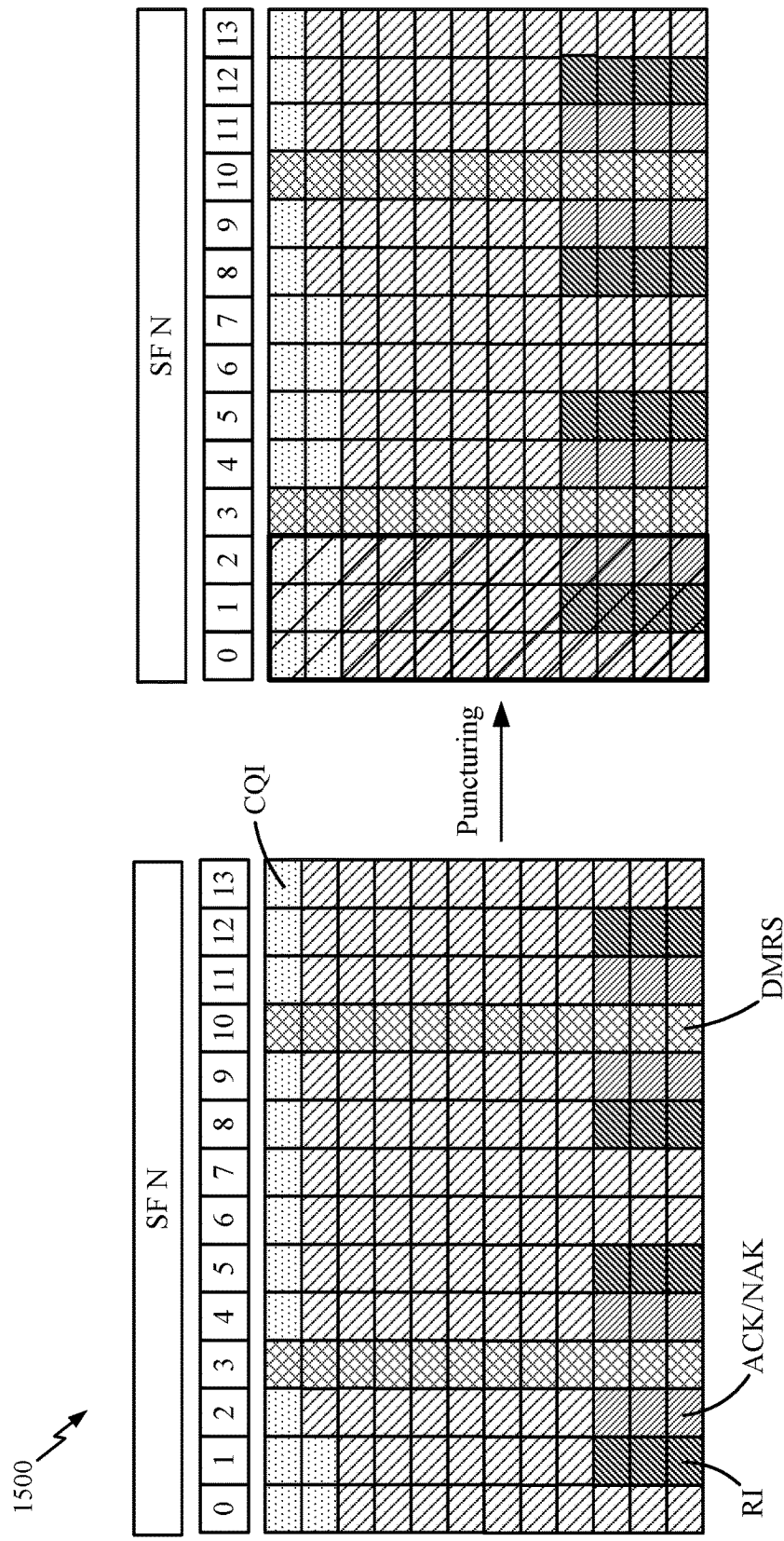
FIG. 15 is a block diagram illustrating example additional resource elements for transmission of control information interrupted by SRS switching, in accordance with certain aspects of the present disclosure.

According to certain aspects, a number of REs may be added that compensates for the number of interfered REs. For example, as shown in FIG. 15, since 3 REs are punctured, an additional RE is used in each of the three remaining symbols for RI transmission (e.g., symbols 5, 8, 12) and ACK/NACK transmission (e.g., slots 4, 9, 11), such that the total number of REs used for transmission of the UCI in the subframe with the interfering are the same as without the interfering.

RE mapping can be controlled by changing the parameter $\beta_{offset}^{HARQ-ACK}$ or $\beta_{offset}^{RI}$. The parameter values may be changed based on the number of interfered symbols. For example, larger values increase the number of RE used for UCI, and may be used for larger numbers of interfered symbols.

The configuration of the different beta parameter values may explicit or implicit. For example, the BS can configure via broadcast signaling (e.g., via system information block (SIB) or semi-static signaling (e.g., radio resource control (RRC) signaling) a set of different parameters values associated with different types of signals and different numbers of punctured symbols. For example, for each punctured subframe, the BS can configure/broadcast the corresponding value to be used for based on the number of punctured symbols. In one example implementation, for ACK, the BS may signal a parameter value of 10 for no puncturing, 15.875 for 3 symbol puncturing, and 20 for 7 symbol puncturing; for RI, the BS may signal a value of 2.5 for no puncturing, 4 for 3 symbol puncturing, and 5 for 7 symbol puncturing; and for channel quality indicator (CQI), the BS may signal a parameter value of 1.25 for no puncturing, 1.625 for 3 symbol puncturing, and 2 for 7 symbol puncturing. For implicit configuration, the BS may configure/signal a single value of the parameter, and the UE may obtain the other values implicitly based on the configured/signaled value.

Example SRS Switching Capability Indication

As mentioned above, switching capability for the UE may depend on multiple factors. Depending on a particular CA configuration, the SRS switching time may vary or, in some cases, switching may not be supported among certain carriers/bands. According to certain aspects, the UE may indicate its switching capability information to the base station. Switching capability information may be information that indicates a capability of the UE to switching between different CCs (in-band or out-of-band) during transmission and may also include an associated switching time for the switching between the different carriers. For example, the information may include a set of supported carriers for the UE, whether the UE supports switching between carriers and/or between particular carriers and/or bands, and/or a switching time (e.g., a retuning) supported by the UE.

According to certain aspects, the carrier switching capability of the UE may be CA configuration dependent. In some aspects, the BS may configure the UE with a CA configuration. The BS may send (e.g., trigger) a query to the UE about the UE's capability for carrier switching for the configured CA configuration. The UE answers (e.g., responds to) the query based on the CA configuration. For example, the UE can send an indication to the BS of the UEs carrier switching capability information for configured CA configuration.

Alternatively, the BS may send (e.g., trigger) a query (e.g., request) to the UE for information regarding the UEs carrier switching capability for one or more potential CA configurations (e.g., a set of CA configurations not currently configured for the UE). For each of the potential CA configurations, the UE may indicate its carrier switching capability. In one illustrative example, the UE may support 4 DL CCs and 2 UL CCs for CA. In this case, the UE may have CC1 and CC2 configured for uplink and downlink, and may have CC3 and CC4 configured for downlink only. The UE switching capability information may include an indication of a 3 symbol switching time for CC1 to CC3, a 1 ms switching time from CC1 to CC4, a 2 ms switching time from CC2 to CC3, and that switching is not supported for CC2 to CC4.

Figure 16:
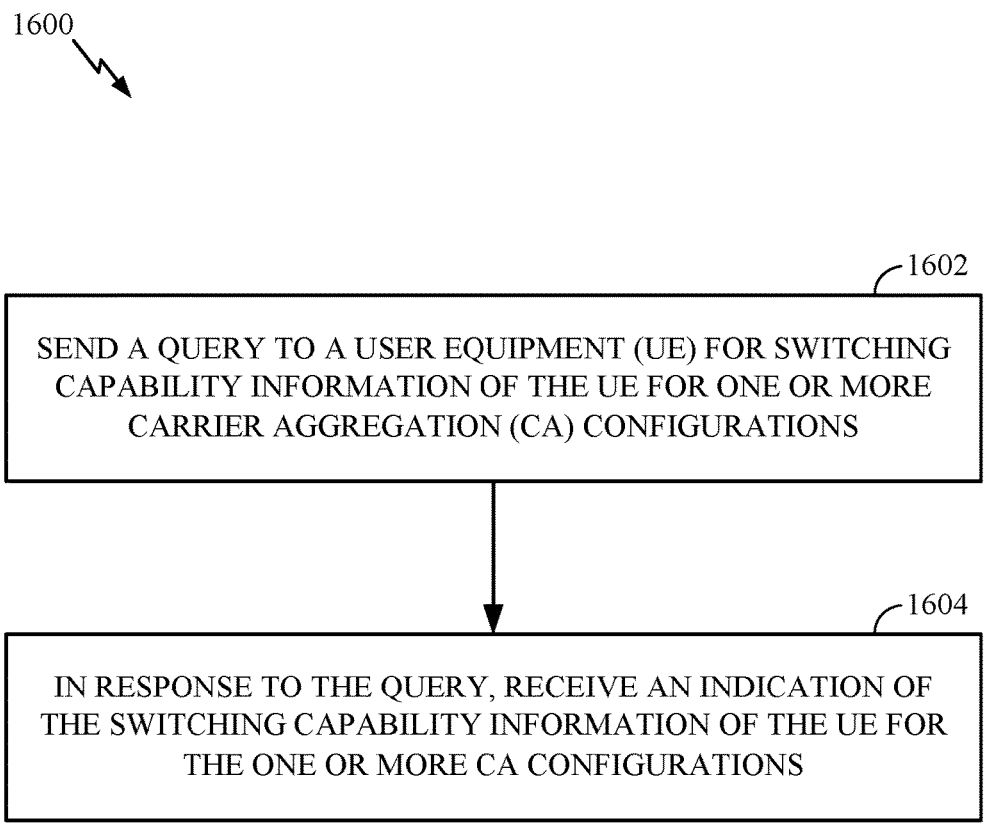
FIG. 16 is a flow diagram illustrating example operations for carrier switching capability indication performed by a UE, according to aspects of the present disclosure.

FIG. 16 is a block diagram illustrating example operations 1600 for carrier switching capability indication, according to aspects of the present disclosure. The operations 1600 may be performed, for example, by a BS (e.g., BS 110). The operations 1600 may begin, at 1602, by sending a query to a UE switching capability information of the UE for one or more CA configurations (e.g., a configured CA configuration or potential CA configurations). At 1604, the BS, in response to the query, receives an indication of the switching capability information of the UE (e.g., information related to CCs supported by the UE, information related to CCs between which the UE supports switching, or information related to a switching time associated with switching between different CCs) for the one or more CA configurations. The BS may send a CA configuration to the UE in response to receiving the indication.

Figure 17:
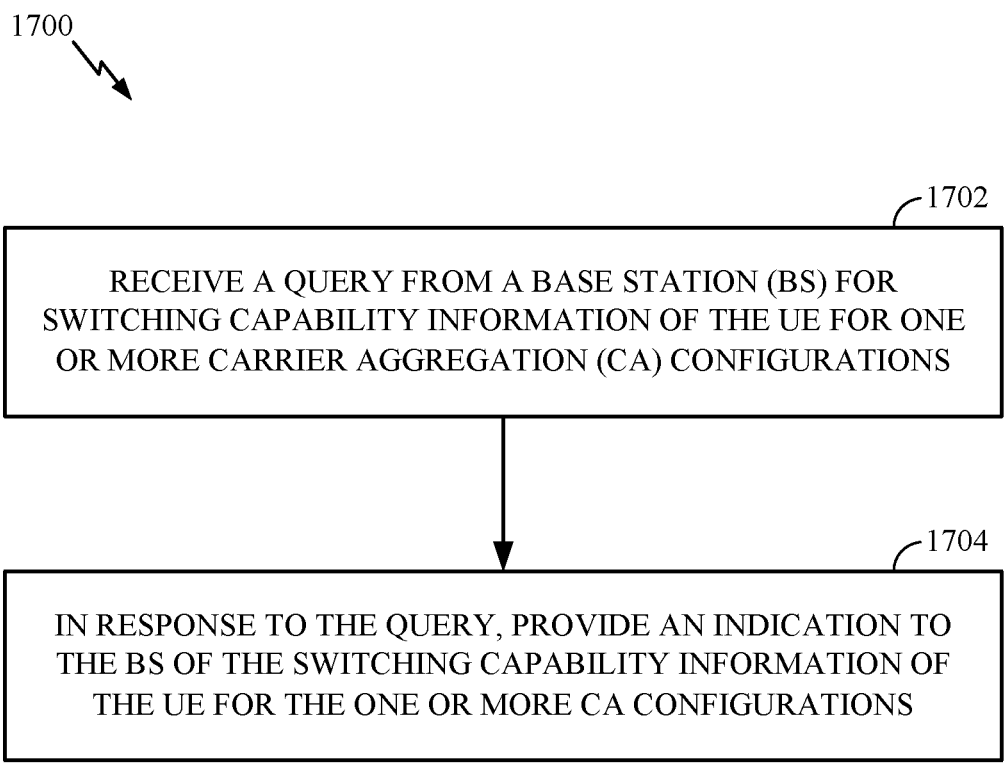
FIG. 17 is a flow diagram illustrating example operations for carrier switching capability indication performed by a BS, according to aspects of the present disclosure.

FIG. 17 is a block diagram illustrating example operations 1700 for carrier switching capability indication, according to aspects of the present disclosure. The operations 1700 may be performed, for example, by a UE (e.g., UE 120). The operations 1700 may be complementary to the operations 1600 by the BS. The operations 1700 may begin, at 1702, by receiving a query from a BS for switching capability information of the UE for one or more CA configurations (e.g., a configured CA configuration or potential CA configurations). At 1704, the UE, in response to the query, provides an indication to the BS of the switching capability information of the UE (e.g., information related to CCs supported by the UE, information related to CCs between which the UE supports switching, or information related to a switching time associated with switching between different CCs) for the one or more CA configurations. The UE may receive a CA configuration in response to providing the indication.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for interrupting communication on a first CC to switch between the first CC and a second CC to transmit an uplink reference signal on the second CC and/or means for adjusting one or more parameters (e.g., values of the one or more parameters) of an uplink transmission on the first CC to account for the interrupting communication on the first CC may comprise a processing system, which may include one or more processors, such as the controller/processor 480, of the user equipment 120 illustrated in FIG. 4. Means for providing an indication to the BS of the switching capability information of the UE for the one or more CA configurations may comprise a transmitter, which may include the TX processor 464, the transmitter(s) 454, and/or the antenna(s) 452 of the user equipment 120 illustrated in FIG. 4. Means for receiving a query from a base station (BS) for switching capability information of the UE for one or more CA configurations; may comprise a receiver, which may include the RX processor 458, the receiver(s) 454, and/or the antenna(s) 452 of the user equipment 120 illustrated in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a wireless node (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a wireless node and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a wireless node and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving a query from a base station (BS) for capability information of the UE; and
   in response to the query, providing an indication to the BS of switching capability information of the UE for one or more carrier aggregation (CA) configurations, the switching capability information associated with switching between a first component carrier (CC) for transmission of a first uplink signal and a second CC for transmission of a second uplink signal, wherein the switching capability information comprises at least one of:
   CCs supported by the UE, CCs between which the UE supports switching, or a switching time associated with switching between different CCs.

2. The method of claim 1, wherein the switching capability of the UE is based on at least one of: UE capability, whether the CCs are contiguous CCs, or whether the CCs are inter-band CCs.

3. The method of claim 1, wherein the first uplink signal comprises at least one of: a physical uplink shared channel (PUSCH) or a physical uplink control channel (PUCCH).

4. The method of claim 1, wherein the second uplink signal comprises a sounding reference signal (SRS).

5. The method of claim 1, wherein the one or more CA configurations comprise a CA configuration that the UE is currently configured with.

6. The method of claim 1, wherein the one or more CA configurations comprise potential CA configurations.

7. The method of claim 1, further comprising:
   receiving a CA configuration in response to providing the indication.

8. A method for wireless communications by a base station (BS), comprising:
   sending a query to a user equipment (UE) for capability information of the UE; and
   in response to the query, receiving an indication of switching capability information of the UE for one or more carrier aggregation (CA) configurations, the switching capability information associated with switching between a first component carrier (CC) for transmission of a first uplink signal and a second CC for transmission of a second uplink signal, wherein the switching capability information comprises at least one of: CCs supported by the UE, CCs between which the UE supports switching, or a switching time associated with switching between different CCs.

9. The method of claim 8, wherein the switching capability of the UE is based on at least one of: UE capability, whether the CCs are contiguous CCs, or whether the CCs are inter-band CCs.

10. The method of claim 8, wherein the first uplink signal comprises at least one of: a physical uplink shared channel (PUSCH) or a physical uplink control channel (PUCCH).

11. The method of claim 8, wherein the second uplink signal comprises a sounding reference signal (SRS).

12. The method of claim 8, wherein the one or more CA configurations comprise a CA configuration that the UE is currently configured with.

13. The method of claim 8, wherein the one or more CA configurations comprise potential CA configurations.

14. The method of claim 8, further comprising:
   providing a CA configuration in response to receiving the indication.

15. A method for wireless communications by a user equipment (UE), comprising:
   interrupting an uplink transmission on a first component carrier (CC) to switch between the first CC and a second CC to transmit an uplink reference signal on the second CC; and
   adjusting one or more parameters or parameter values of the uplink transmission on the first CC to account for the interrupting communication on the second CC.

16. The method of claim 15, wherein interrupting communication on the first CC to switch between the first CC and the second CC includes interrupting communication caused by at least one of switching to the second CC from the first CC to transmit the uplink reference signal on the second CC or switching back from the second CC to the first CC to resume the uplink transmission on the first CC.

17. The method of claim 15, wherein the second CC is a CC configured for downlink data transmission only.

18. The method of claim 15, wherein adjusting the one or more parameters or parameter values comprises adjusting, based on a time to switch between the first CC and the second CC, a transmit power level associated with one or more symbols of a physical channel for the uplink transmission on the first CC.

19. The method of claim 15, wherein the uplink transmission on the first CC comprises at least one of a physical uplink shared channel (PUSCH) or a physical uplink control channel (PUCCH).

20. The method of claim 15, wherein the reference signal comprises a sounding reference signal (SRS).

21. The method of claim 15, wherein adjusting the one or more parameters or parameter values comprises adjusting resources used for the uplink transmission on the first CC.

22. The method of claim 15, further comprising:
   receiving a set of parameter values, from a base station (BS), the parameter values associated with at least one of: different durations of the interruption or different types of uplink transmission; and determining the adjustment for the one or more parameters or parameter values based on the received set of parameters values and the associated durations or uplink transmission types.

23. The method of claim 22, wherein the set of parameter values is received via at least one of a system information block (SIB) broadcast or radio resource control (RRC) signaling.

24. The method of claim 15, further comprising receiving an indication from the base station of the adjustment for the one or more parameters or parameter values.

25. An apparatus for wireless communications by a user equipment (UE), comprising:

means for receiving a query from a base station (BS) for capability information of the UE; and means for, in response to the query, providing an indication to the BS of the switching capability information of the UE for one or more carrier aggregation (CA) configurations, the switching capability information associated with switching between a first component carrier (CC) for transmission of a first uplink signal and a second CC for transmission of a second uplink signal, wherein the switching capability information comprises at least one of: CCs supported by the UE, CCs between which the UE supports switching, or a switching time associated with switching between different CCs.

26. The apparatus of claim 25, wherein the one or more CA configurations comprise potential CA configurations.

27. The apparatus of claim 25, wherein the switching capability of the UE is based on at least one of: UE capability, whether the CCs are contiguous CCs, or whether the CCs are inter-band CCs.

28. The apparatus of claim 25, wherein the first uplink signal comprises at least one of: a physical uplink shared channel (PUSCH) or a physical uplink control channel (PUCCH).

29. The apparatus of claim 25, wherein the second uplink signal comprises a sounding reference signal (SRS).

30. The apparatus of claim 25, wherein the one or more CA configurations comprise a CA configuration that the UE is currently configured with.

31. The apparatus of claim 25, further comprising:
means for receiving a CA configuration in response to providing the indication.

32. An apparatus for wireless communications, comprising:

means for sending a query to a user equipment (UE) for capability information of the UE; and means for, in response to the query, receiving an indication of switching capability information of the UE for one or more carrier aggregation (CA) configurations, the switching capability information associated with switching between a first component carrier (CC) for transmission of a first uplink signal and a second CC for transmission of a second uplink signal, wherein the switching capability information comprises at least one of: CCs supported by the UE, CCs between which the UE supports switching, or a switching time associated with switching between different CCs.

33. The apparatus of claim 32, wherein the switching capability of the UE is based on at least one of: UE capability, whether the CCs are contiguous CCs, or whether the CCs are inter-band CCs.

34. The apparatus of claim 32, wherein the first uplink signal comprises at least one of: a physical uplink shared channel (PUSCH) or a physical uplink control channel (PUCCH).

35. The apparatus of claim 32, wherein the second uplink signal comprises a sounding reference signal (SRS).

36. The apparatus of claim 32, wherein the one or more CA configurations comprise a CA configuration that the UE is currently configured with.

37. The apparatus of claim 32, wherein the one or more CA configurations comprise potential CA configurations.

38. The apparatus of claim 32, further comprising:
means for providing a CA configuration in response to receiving the indication.

39. An apparatus for wireless communications, comprising:

means for interrupting an uplink transmission on a first component carrier (CC) to switch between the first CC and a second CC to transmit an uplink reference signal on the second CC; and means for adjusting one or more parameters or parameter values of the uplink transmission on the first CC to account for the interrupting communication on the second CC.

40. The apparatus of claim 39, wherein interrupting communication on the first CC to switch between the first CC and the second CC includes interrupting communication caused by at least one of switching to the second CC from the first CC to transmit the uplink reference signal on the second CC or switching back from the second CC to the first CC to resume the uplink transmission on the first CC.

41. The apparatus of claim 39, wherein the second CC is a CC configured for downlink data transmission only.

42. The apparatus of claim 39, wherein adjusting the one or more parameters or parameter values comprises adjusting, based on a time to switch between the first CC and the second CC, a transmit power level associated with one or more symbols of a physical channel for the uplink transmission on the first CC.

43. The apparatus of claim 39, wherein the uplink transmission on the first CC comprises at least one of a physical uplink shared channel (PUSCH) or a physical uplink control channel (PUCCH).

44. The apparatus of claim 39, wherein the reference signal comprises a sounding reference signal (SRS).

45. The apparatus of claim 39, wherein adjusting the one or more parameters or parameter values comprises adjusting resources used for the uplink transmission on the first CC.

46. The apparatus of claim 39, further comprising:
means for receiving a set of parameter values, from a base station (BS), the parameter values associated with at least one of: different durations of the interruption or different types of uplink transmission; and means for determining the adjustment for the one or more parameters or parameter values based on the received set of parameters values and the associated durations or uplink transmission types.

47. The apparatus of claim 46, wherein the set of parameter values is received via at least one of a system information block (SIB) broadcast or radio resource control (RRC) signaling.

48. The apparatus of claim 39, further comprising means for receiving an indication from a base station (BS) of the adjustment for the one or more parameters or parameter values.

49. An apparatus for wireless communications, comprising:

at least one processor coupled with a memory and configured to:
   receive a query from a base station (BS) for capability information of the apparatus; and
   in response to the query, provide an indication to the BS of the switching capability information of the apparatus for one or more carrier aggregation (CA) configurations, the switching capability information associated with switching between a first component carrier (CC) for transmission of a first uplink signal and a second CC for transmission of a second uplink signal, wherein the switching capability information comprises at least one of: CCs supported by the apparatus, CCs between which the apparatus supports switching, or a switching time associated with switching between different CCs.

50. The apparatus of claim 49, wherein the one or more CA configurations comprise potential CA configurations.

51. The apparatus of claim 49, wherein the switching capability of the apparatus is based on at least one of: a user equipment (UE) capability, whether the CCs are contiguous CCs, or whether the CCs are inter-band CCs.

52. The apparatus of claim 49, wherein the first uplink signal comprises at least one of: a physical uplink shared channel (PUSCH) or a physical uplink control channel (PUCCH).

53. The apparatus of claim 49, wherein the second uplink signal comprises a sounding reference signal (SRS).

54. The apparatus of claim 49, wherein the one or more CA configurations comprise a CA configuration that the apparatus is currently configured with.

55. The apparatus of claim 49, wherein the at least one processor is configured to receive a CA configuration in response to providing the indication.

56. An apparatus for wireless communications, comprising:
   at least one processor coupled with a memory and configured to:
      send a query to a user equipment (UE) for capability information of the UE; and
      in response to the query, receive an indication of switching capability information of the UE for one or more carrier aggregation (CA) configurations, the switching capability information associated with switching between a first component carrier (CC) for transmission of a first uplink signal and a second CC for transmission of a second uplink signal, wherein the switching capability information comprises at least one of:
   CCs supported by the UE, CCs between which the UE supports switching, or a switching time associated with switching between different CCs.

57. The apparatus of claim 56, wherein the switching capability of the UE is based on at least one of: UE capability, whether the CCs are contiguous CCs, or whether the CCs are inter-band CCs.

58. The apparatus of claim 56, wherein the first uplink signal comprises at least one of: a physical uplink shared channel (PUSCH) or a physical uplink control channel (PUCCH).

59. The apparatus of claim 56, wherein the second uplink signal comprises a sounding reference signal (SRS).

60. The apparatus of claim 56, wherein the one or more CA configurations comprise a CA configuration that the UE is currently configured with.

61. The apparatus of claim 56, wherein the one or more CA configurations comprise potential CA configurations.

62. The apparatus of claim 56, wherein the at least one processor is configured to provide a CA configuration in response to receiving the indication.

63. An apparatus for wireless communications, comprising:
   at least one processor coupled with a memory and configured to:
      interrupt an uplink transmission on a first component carrier (CC) to switch between the first CC and a second CC to transmit an uplink reference signal on the second CC; and
      adjust one or more parameters or parameter values of the uplink transmission on the first CC to account for the interrupting communication on the second CC.

64. The apparatus of claim 63, wherein interrupting communication on the first CC to switch between the first CC and the second CC includes interrupting communication caused by at least one of switching to the second CC from the first CC to transmit the uplink reference signal on the second CC or switching back from the second CC to the first CC to resume the uplink transmission on the first CC.

65. The apparatus of claim 63, wherein the second CC is a CC configured for downlink data transmission only.

66. The apparatus of claim 63, wherein adjusting the one or more parameters or parameter values comprises adjusting, based on a time to switch between the first CC and the second CC, a transmit power level associated with one or more symbols of a physical channel for the uplink transmission on the first CC.

67. The apparatus of claim 63, wherein the uplink transmission on the first CC comprises at least one of a physical uplink shared channel (PUSCH) or a physical uplink control channel (PUCCH).

68. The apparatus of claim 63, wherein the reference signal comprises a sounding reference signal (SRS).

69. The apparatus of claim 63, wherein adjusting the one or more parameters or parameter values comprises adjusting resources used for the uplink transmission on the first CC.

70. The apparatus of claim 63, wherein the at least one processor is configured to:
   receive a set of parameter values, from a base station (BS), the parameter values associated with at least one of: different durations of the interruption or different types of uplink transmission; and
   determine the adjustment for the one or more parameters or parameter values based on the received set of parameters values and the associated durations or uplink transmission types.

71. The apparatus of claim 70, wherein the set of parameter values is received via at least one of a system information block (SIB) broadcast or radio resource control (RRC) signaling.

72. The apparatus of claim 63, wherein the at least one processor is configured to receive an indication from a base station (BS) of the adjustment for the one or more parameters or parameter values.

73. A non-transitory computer readable medium storing computer executable code thereon for wireless communications, comprising:
   code for receiving a query from a base station (BS) for capability information of a user equipment (UE); and
   code for, in response to the query, providing an indication to the BS of the switching capability information of the UE for one or more carrier aggregation (CA) configurations, the switching capability information associated with switching between a first component carrier (CC) for transmission of a first uplink signal and a second CC for transmission of a second uplink signal, wherein the switching capability information comprises at least one of: CCs supported by the UE, CCs between which the UE supports switching, or a switching time associated with switching between different CCs.

74. The computer readable medium of claim 73, wherein the one or more CA configurations comprise potential CA configurations.

75. The computer readable medium of claim 73, wherein the switching capability is based on at least one of: UE capability, whether the CCs are contiguous CCs, or whether the CCs are inter-band CCs.

76. The computer readable medium of claim 73, wherein the first uplink signal comprises at least one of: a physical uplink shared channel (PUSCH) or a physical uplink control channel (PUCCH).

77. The computer readable medium of claim 73, wherein the second uplink signal comprises a sounding reference signal (SRS).

78. The computer readable medium of claim 73, wherein the one or more CA configurations comprise a CA configuration that the UE is currently configured with.

79. The computer readable medium of claim 73, further comprising code for receiving a CA configuration in response to providing the indication.

80. A non-transitory computer readable medium storing computer executable code thereon for wireless communications, comprising:
    code for sending a query to a user equipment (UE) for capability information of the UE; and
    code for, in response to the query, receiving an indication of switching capability information of the UE for one or more carrier aggregation (CA) configurations, the switching capability information associated with switching between a first component carrier (CC) for transmission of a first uplink signal and a second CC for transmission of a second uplink signal, wherein the switching capability information comprises at least one of: CCs supported by the UE, CCs between which the UE supports switching, or a switching time associated with switching between different CCs.

81. The computer readable medium of claim 80, wherein the switching capability of the UE is based on at least one of: UE capability, whether the CCs are contiguous CCs, or whether the CCs are inter-band CCs.

82. The computer readable medium of claim 80, wherein the first uplink signal comprises at least one of: a physical uplink shared channel (PUSCH) or a physical uplink control channel (PUCCH).

83. The computer readable medium of claim 80, wherein the second uplink signal comprises a sounding reference signal (SRS).

84. The computer readable medium of claim 80, wherein the one or more CA configurations comprise a CA configuration that the UE is currently configured with.

85. The computer readable medium of claim 80, wherein the one or more CA configurations comprise potential CA configurations.

86. The computer readable medium of claim 80, further comprising code for providing a CA configuration in response to receiving the indication.

87. A non-transitory computer readable medium storing computer executable code thereon for wireless communications, comprising:
    code for interrupting an uplink transmission on a first component carrier (CC) to switch between the first CC and a second CC to transmit an uplink reference signal on the second CC; and
    code for adjusting one or more parameters or parameter values of the uplink transmission on the first CC to account for the interrupting communication on the second CC.

88. The computer readable medium of claim 87, wherein interrupting communication on the first CC to switch between the first CC and the second CC includes interrupting communication caused by at least one of switching to the second CC from the first CC to transmit the uplink reference signal on the second CC or switching back from the second CC to the first CC to resume the uplink transmission on the first CC.

89. The computer readable medium of claim 87, wherein the second CC is a CC configured for downlink data transmission only.

90. The computer readable medium of claim 87, wherein adjusting the one or more parameters or parameter values comprises adjusting, based on a time to switch between the first CC and the second CC, a transmit power level associated with one or more symbols of a physical channel for the uplink transmission on the first CC.

91. The computer readable medium of claim 87, wherein the uplink transmission on the first CC comprises at least one of a physical uplink shared channel (PUSCH) or a physical uplink control channel (PUCCH).

92. The computer readable medium of claim 87, wherein the reference signal comprises a sounding reference signal (SRS).

93. The computer readable medium of claim 87, wherein adjusting the one or more parameters or parameter values comprises adjusting resources used for the uplink transmission on the first CC.

94. The computer readable medium of claim 87, further comprising:
    code for receiving a set of parameter values, from a base station (BS), the parameter values associated with at least one of: different durations of the interruption or different types of uplink transmission; and
    code for determining the adjustment for the one or more parameters or parameter values based on the received set of parameters values and the associated durations or uplink transmission types.

95. The computer readable medium of claim 94, wherein the set of parameter values is received via at least one of a system information block (SIB) broadcast or radio resource control (RRC) signaling.

96. The computer readable medium of claim 87, further comprising receiving an indication from a base station (BS) of the adjustment for the one or more parameters or parameter values.

* * * * *